(12) United States Patent
Choe et al.

(10) Patent No.: US 10,582,310 B1
(45) Date of Patent: Mar. 3, 2020

(54) THERMOACOUSTIC TRANSDUCER AND METHODS FOR RESONANT GENERATION AND AMPLIFICATION OF SOUND EMISSION

(71) Applicants: Raytheon Company, Waltham, MA (US); Board of Regents, The University of Texas System, Austin, TX (US)

(72) Inventors: Howard C. Choe, Southlake, TX (US); Mikhail Kozlov, Dallas, TX (US)

(73) Assignees: Raytheon Company, Waltham, MA (US); Board of Regents, The University of Texas System, Austin, TX (US)

( * ) Notice: Subject to any disclaimer, the term of this patent is extended or adjusted under 35 U.S.C. 154(b) by 397 days.

(21) Appl. No.: 15/676,340

(22) Filed: Aug. 14, 2017

(51) Int. Cl.
*H04R 23/02* (2006.01)
*H04R 23/00* (2006.01)

(52) U.S. Cl.
CPC ..... *H04R 23/002* (2013.01); *H04R 2307/023* (2013.01)

(58) Field of Classification Search
CPC ...... H04R 23/002; H04R 31/00; H04R 17/00; H04R 31/006; H04R 15/00; H04R 19/005;
(Continued)

(56) References Cited

U.S. PATENT DOCUMENTS 3,964,571 A * 6/1976 Snell ................ H04R 1/345
181/150
5,212,988 A * 5/1993 White ................ B01L 3/5027
73/599
(Continued)

FOREIGN PATENT DOCUMENTS

DE  102014101287 A1 * 8/2015

OTHER PUBLICATIONS

Xiao et al. "Flexible, Stretchable, Transparent Carbon Nanotube Thin Film Loudspeakers", Nano Letters, vol. 8, No. 12, Sep. 11, 2008, 7 pages.
(Continued)

*Primary Examiner* — Hovhannes Baghdasaryan
*Assistant Examiner* — Amie M Ndure
(74) *Attorney, Agent, or Firm* — Daly Crowley Mofford & Durkee, LLP

(57) ABSTRACT

A transducer includes an acoustic reflector, an acoustic coupler and one or more thermoacoustic frames. The acoustic coupler is disposed proximate to an output of the transducer and each of the thermoacoustic frames is disposed between the acoustic reflector and the acoustic coupler. The thermoacoustic frames, the acoustic reflector and the acoustic coupler form a resonator with each of the thermoacoustic frames configured to emit a broadband acoustic signal in response to receiving electrical energy. Additionally, the resonator is configured to emit a narrowband acoustic signal at the transducer output in response to receiving the broad-
(Continued)

band acoustic signal. A method includes adjusting a frequency of the narrowband acoustic signal by controlling a spacing between the thermoacoustic frames and one or more components of the resonator. Thermoacoustic device embodiments capable of resonant emission of intense ultrasound radiation generated by sheets of multi-walled carbon nanotubes (MWNT) are also disclosed.

20 Claims, 24 Drawing Sheets

(58) Field of Classification Search
CPC .... H04R 25/604; H04R 19/02; H04R 25/405; H04R 19/04; G01S 7/521; H04M 1/035; F24H 2250/10; F24H 3/002; H03G 9/025
See application file for complete search history.

(56) References Cited

U.S. PATENT DOCUMENTS

| | | | |
|---|---|---|---|
| 8,199,938 B2 | 6/2012 | Jiang et al. | |
| 8,249,279 B2 | 8/2012 | Jiang et al. | |
| 8,259,968 B2 | 9/2012 | Jiang et al. | |
| 8,331,586 B2 | 12/2012 | Jiang et al. | |
| 8,625,822 B2 | 1/2014 | Jiang et al. | |
| 8,634,579 B2 | 1/2014 | Jiang et al. | |
| 8,767,981 B2 | 7/2014 | Jiang et al. | |
| 8,811,632 B2 | 8/2014 | Jiang et al. | |
| 8,831,252 B2 | 9/2014 | Jiang et al. | |
| 8,837,753 B2 | 9/2014 | Jiang et al. | |
| 8,958,579 B2 | 2/2015 | Jiang et al. | |
| 9,061,906 B2 | 6/2015 | Wei et al. | |
| 9,088,851 B2 | 7/2015 | Wei et al. | |
| 9,161,135 B2 | 10/2015 | Wei et al. | |
| 9,241,221 B2 | 1/2016 | Wei et al. | |
| 2008/0067893 A1* | 3/2008 | Peacock | H02N 2/18 310/322 |
| 2009/0184604 A1* | 7/2009 | Symko | F02G 1/043 310/334 |
| 2012/0123274 A1* | 5/2012 | Ikeda | B06B 1/0622 600/472 |
| 2015/0053366 A1* | 2/2015 | Melsheimer | F28D 20/00 165/10 |
| 2017/0156600 A1* | 6/2017 | Ntziachristos | A61B 5/0095 |

OTHER PUBLICATIONS

Zhang et al. "Strong, transparent, multifunctional, carbon nanotube sheets," Science, vol. 309, No. 5738, 2005, 11 pages.
Xiao et al. "High frequency response of carbon nanotube thin film speaker in gases", AIP Journal of Applied Physics, vol. 110, Issue 8, 2 pages (abstract only).

* cited by examiner

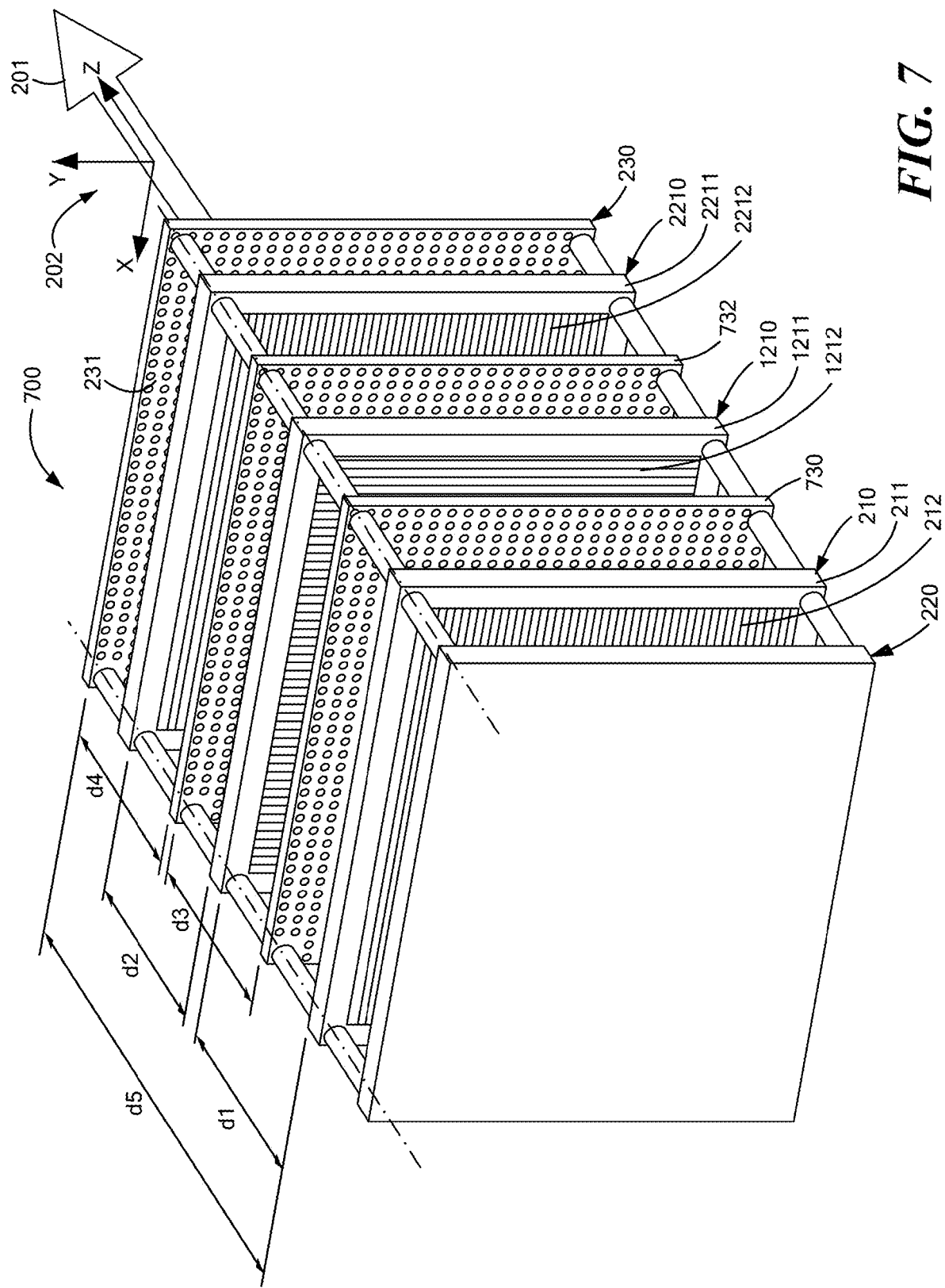

THERMOACOUSTIC TRANSDUCER AND METHODS FOR RESONANT GENERATION AND AMPLIFICATION OF SOUND EMISSION

BACKGROUND

As is known in the art, transducers are used in a variety of applications to convert energy from one form to another. For example, in acoustic transmitter applications (e.g., loudspeaker applications), transducers typically convert electrical energy into acoustic energy and transmit or emit the converted acoustic energy. Additionally, in acoustic sensing applications (e.g., microphone applications), transducers typically convert sensed or detected acoustic energy into electrical energy. Ultrasonic transducers are one example type of transducer which may convert electrical energy to acoustic energy, particularly high frequency acoustic energy (e.g., acoustic energy having a frequency of greater than about twenty kilohertz (kHz)). Ultrasonic transducers may transmit the converted acoustic energy (e.g., at a transducer output). Additionally, ultrasonic transducers may convert sensed or detected high frequency acoustic energy to electrical energy.

Conventional ultrasonic transducers generally comprise one or more piezoelectric elements which are provided from piezoelectric materials (e.g., piezoelectric ceramics, crystals, composites and/or polymers), and use the piezoelectric effect to emit or detect high frequency acoustic energy. For example, electrical stimulation of the piezoelectric materials in the piezoelectric elements may cause mechanical distortion of the piezoelectric materials, resulting in vibrations of the materials and production of acoustic energy by the piezoelectric elements and, thus, the ultrasonic emission.

While conventional piezoelectric ultrasonic transducers are capable of emitting and/or detecting high frequency acoustic energy, they are subject to several drawbacks. One example drawback is that the piezoelectric elements found in conventional piezoelectric ultrasonic transducers are typically only capable of generating acoustic energy having a single frequency. As a result of the foregoing, in applications where broadband frequency coverage is required, conventional piezoelectric ultrasonic transducers generally comprise large arrays of piezoelectric elements, making piezoelectric ultrasonic transducers costly and unsuitable for compact applications (e.g., mobile communications systems).

SUMMARY

Described herein are concepts, systems, circuits and techniques related to thermoacoustic transducer embodiments and methods for resonant generation and amplification of sound emission using a thermoacoustic transducer. The described thermoacoustic transducer may be scalable (e.g., in size per desired emission frequency and in output energy) and tunable (e.g., at least one of a frequency, a frequency bandwidth, a beam profile and/or an acoustic intensity emitted by the transducer may be tuned or adjusted). More particularly, in one aspect, a transducer according to the disclosure includes an acoustic reflector, an acoustic coupler and one or more thermoacoustic frames. The acoustic coupler is disposed proximate to an output of the transducer and each of the thermoacoustic frames is disposed between the acoustic reflector and the acoustic coupler. The thermoacoustic frames, the acoustic reflector and the acoustic coupler form a resonator with each of the thermoacoustic frames configured to emit or generate a broadband acoustic signal (also sometimes referred to herein as a "first acoustic energy") in response to receiving electrical energy. Additionally, the resonator is configured to emit a narrowband acoustic signal (also sometimes referred to herein as a "second acoustic energy") at the transducer output. In embodiments, the resonator shapes the acoustic emission of the first acoustic energy from the thermoacoustic frames in emitting the second acoustic energy. Additionally, in embodiments the second acoustic energy is a substantially intense narrowband signal, for example, having a frequency of greater than about 100 kiloHertz (kHz).

The transducer may include one or more of the following features individually or in combination with other features. The thermoacoustic frames of the transducer may each comprise one or more thermoacoustic sheets and a frame over which the thermoacoustic sheets are disposed. The thermoacoustic sheets may comprise single or multi-walled carbon nanotube sheets. The thermoacoustic sheets may comprise wire mesh, carbon fiber, carbon fabric, metalized polymer fiber or graphene. The frame over which the thermoacoustic sheets are disposed may comprise at least one electrically conductive material.

The one or more thermoacoustic frames may comprise a plurality of thermoacoustic frames and each of the thermoacoustic frames may be spaced apart from each other by a predetermined distance. A frequency of the second acoustic energy may correspond to the predetermined distance. The frequency and the predetermined distance may be adjustable. The frequency may be further based upon at least one of a current and/or a voltage level of the received electrical energy and dimensions of the acoustic reflector, the acoustic coupler and/or the thermoacoustic frames. The predetermined distance may be substantially equal to $n\lambda$, where $\lambda$ is a wavelength of the second acoustic energy and n is an integer number. Each of the thermoacoustic frames may have at least one side and opposing first and second surfaces. The first and second surfaces of a first selected one of the thermoacoustic frames may be substantially parallel with respect to the first and second surfaces of each of the other thermoacoustic frames.

A distance between the acoustic reflector and the acoustic coupler may be adjustable. A frequency of the second acoustic energy may be greater than about 100 kilohertz (kHz). In embodiments, the frequency of the second acoustic energy is between about 100 kHz and about 113.5 kHz. Additionally, in embodiments a bandwidth of the second acoustic energy is between about 4.4 kHz and about 6.4 kHz. The acoustic reflector may comprise one or more acoustically reflective materials having an acoustic reflectance substantially equal to about one hundred percent. The acoustically reflective materials may be thermally conductive. Each of the thermoacoustic frames may correspond to a stage of the transducer. A beam profile of the second acoustic energy may be based upon a number of stages in the transducer. The transducer may be provided in a device (e.g., a communications device) and the transducer output may be proximate to an output of the device.

In another aspect of the concepts described herein, transducer includes an acoustic reflector, a plurality of acoustic couplers and one or more thermoacoustic frames. A first selected one of the thermoacoustic frames is disposed between the acoustic reflector and a first selected one of the acoustic couplers that is proximate to the acoustic reflector and distal from an output of the transducer. Additionally, remaining ones of the thermoacoustic frames are disposed between at least two of the acoustic couplers. The thermoacoustic frames, the acoustic reflector and the acoustic couplers form a resonator with each of the thermoacoustic frames configured to emit a first acoustic energy in response to receiving electrical energy. Additionally, the resonator is configured to emit a second acoustic energy at the transducer output in response to the acoustic reflector and the acoustic couplers receiving the first acoustic energy.

The transducer may include one or more of the following features individually or in combination with other features. The thermoacoustic frames of the transducer may each comprise one or more thermoacoustic sheets and a frame over which the thermoacoustic sheets are disposed. The thermoacoustic sheets may comprise single or multi-walled carbon nanotube sheets. The thermoacoustic frames and the acoustic couplers may be spaced apart from each other by a predetermined distance. The transducer may be provided in a device (e.g., a communications device) and the transducer output may be proximate to an output of the device.

In a further aspect of the concepts described herein, a method includes receiving electrical energy at an input of one or more thermoacoustic frames and emitting, by each of the thermoacoustic frames, a first acoustic energy in response to the received electrical energy. The method also includes receiving, by an acoustic reflector and an acoustic coupler, the first acoustic energy. The method additionally includes emitting, by a resonator formed by the thermoacoustic frames, the acoustic reflector and the acoustic coupler, a second acoustic energy in response to the acoustic reflector and the acoustic coupler receiving first acoustic energy. The method further includes adjusting a frequency of the second acoustic energy by controlling a spacing between the thermoacoustic frames and one or more components of the resonator.

In another aspect of the concepts described herein, thermoacoustic device embodiments capable of resonant emission of intense ultrasound radiation generated by sheets of multi-walled carbon nanotubes (MWNT) are disclosed. In embodiments, a thermoacoustic device according to a first embodiment of the disclosure includes a parallel stack of MWNT sheets coupled to frames (collectively "MWNT frames"), with the MWNT frames disposed between a sound reflector and an acoustically semitransparent screen to form a resonator. Additionally, in embodiments a thermoacoustic device according to a second embodiment of the disclosure includes MWNT frames separated (or otherwise spaced apart from each other) by acoustically semitransparent screens to obtain a distributed resonator. In embodiments, when the MWNT frames of the thermoacoustic device are heated with alternating electrical current, the MWNT frames may each emit a respective thermoacoustic signal that is resonantly enhanced by a resonator formed in the thermoacoustic device through constructive interference, for example, to produce (or otherwise emit) a highly directional, intense ultrasound beam or narrowband signal at an output of the thermoacoustic device.

In a further aspect of the concepts described herein, multi-stage ultrasonic transducer embodiments (e.g., 3- and 4-stage ultrasonic transducers) capable of emitting sound radiation at frequencies of between about 110 kHz and about 113.5 kHz, with a bandwidth of between about 4.4 and about 6.4 kHz and a maximum sound pressure level ~2 Pa/W are disclosed. In embodiments, the emitted sound radiation can be modulated in time and transmitted over substantial distances in air, for example.

In embodiments, thermoacoustic frames of example transducers according to the disclosure are assembled in stacks to obtain multi-stage transducers. In one aspect, transducers according to a first embodiment of the disclosure have a single acoustic coupler (or output coupler) at resonator ends of the transducers. Additionally, in one aspect, transducers according to a second embodiment of the disclosure have acoustic couplers disposed between thermoacoustic frames of the transducers to form a distributed resonator. In embodiments, distances between respective thermoacoustic frames and acoustic couplers may be adjusted with carefully selected spacers or other spacing means. Additionally, in embodiments dimensions of the spacers or other spacing means may be estimated and experimentally adjusted for optimum transducer performance.

The above and below described thermoacoustic transducers, devices and methods may be found suitable for use in a variety of applications. For example, the thermoacoustic transducers, devices and methods may be found suitable for use in communications systems and devices that enable covert communications. The communications systems and devices may correspond to covert ultrasonic communications systems and devices. The thermoacoustic transducers, devices and methods may also be found suitable for use in audio applications (e.g., loudspeakers and microphones), surveillance applications, imaging applications (e.g., for imaging of a surface or an object), as emitters of noise suppression signal in active noise canceling systems (e.g., for use in auditorium, cockpit, etc.), and a number of other applications.

BRIEF DESCRIPTION OF THE DRAWINGS

The foregoing features of the disclosure, as well as the disclosure itself may be more fully understood from the following detailed description of the drawings, in which:

FIG. 7 is a block diagram of an example transducer according to a second embodiment of the disclosure;

DETAILED DESCRIPTION

Figure 1:
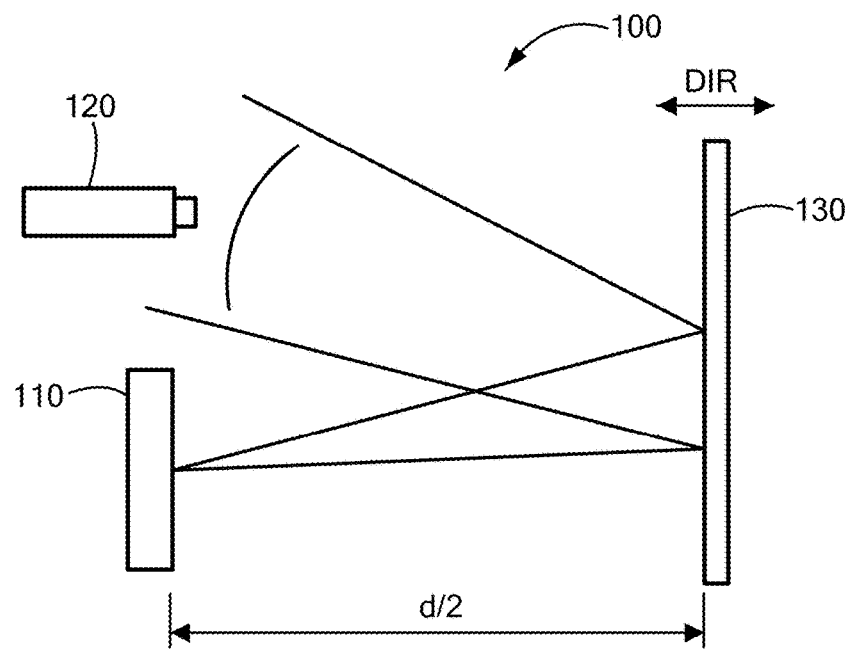
FIG. 1 shows an example acoustic system.

The features and other details of the concepts, systems, and techniques sought to be embodiments described herein are shown by way of illustration and not as limitations of the disclosure and the concepts described herein. Features of the subject matter described herein can be employed in various embodiments without departing from the scope of the concepts sought to be protected. Embodiments of the present disclosure and associated advantages may be best understood by referring to the drawings, where like numerals are used for like and corresponding parts throughout the various views. It should, of course, be appreciated that elements shown in the figures are not necessarily drawn to scale. For example, the dimensions of some elements may be exaggerated relative to other elements for clarity.

Referring to FIG. 1, an example system 100 for emitting and detecting (or sensing) acoustic energy in accordance with illustrative embodiments of the disclosure includes an acoustic source or transmitter 110 and a sensor 120. The acoustic transmitter 110, which may be the same as or similar to transducers according to the disclosure as described in connection with figures below, is spaced apart from an object or surface 130 (e.g., a wall) by a distance (here, a distance d/2) and emits acoustic energy in a direction towards the surface 130. The acoustic energy is emitted by the acoustic transmitter 110 (here, a signal transmitter) in response to the acoustic transmitter 110 receiving electrical energy from an energy source (e.g., a current and/or a voltage source).

The sensor 120 (e.g., a microphone or a microphone array) receives the acoustic energy emitted by the acoustic transmitter 110 via the surface 130, which surface may be a stationary surface or a surface that is movable in one or more directions DIR. The received acoustic energy, which travels a distance (here, a distance greater than d/2) between an output of the acoustic transmitter 110 and an input of the sensor 120, can be processed by a processor (not shown) of the system 100 to detect one or more characteristics associated with the emitted acoustic energy (e.g., an acoustic intensity, a frequency of the acoustic energy, etc.). The received acoustic energy can also be processed by the processor to detect one or more characteristics associated with the surface 130. For example, the acoustic energy can be processed to generate an image of the surface 130 and/or identify the surface 130. As one example, the surface 130 may be identified based on an acoustic signature for the surface 130.

In one embodiment, the system 100 includes a mounting surface or structure (e.g., 3100, shown in FIG. 2C) to support at least one of the acoustic transmitter 110 and the sensor 120. Additionally, in one embodiment, sensor 120 of the system 100 is coupled to, or disposed proximate to, the surface 130 from which the acoustic energy detected by the sensor 120 is received from. It is understood that the system 100 may comprise additional acoustic transmitters and sensors which can be located at various locations to emit and detect acoustic energy in a suitable manner. Additionally, it is understood that the system 100 may comprise objects or surfaces in addition to, or in lieu of, surface 130.

It is also understood that a range of acoustic frequencies can be emitted by the acoustic transmitter 110, from audible frequencies of about twenty Hertz (Hz) to about twenty kilohertz (kHz), to ultrasonic frequencies which are greater than about twenty kilohertz (Khz). Ultrasonic frequencies, for example, are typically suitable for imaging and detection applications.

Example applications of system 100 include acoustic inspection systems, communications systems, acoustic measurement systems, proximity sensing systems, and any number of other systems or devices in which acoustic energy may be employed. A wide variety of further applications will be readily apparent to one of ordinary skill in the art.

Figure 1A:
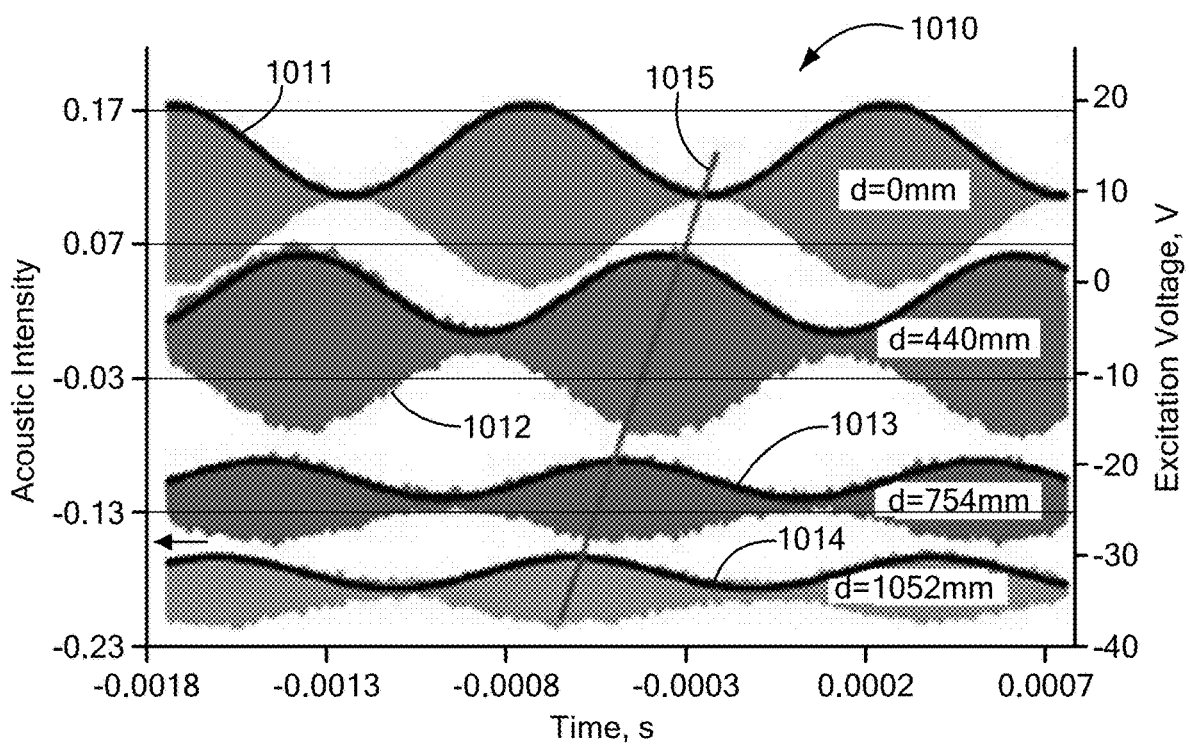
FIG. 1A is a plot illustrating example acoustic intensities of acoustic energy emitted by an example transducer.

Referring to FIG. 1A, a plot 1010 illustrating acoustic intensities of acoustic energy emitted by an example transducer which may be the same as or similar to acoustic transmitter 110 of FIG. 1 is shown. The acoustic energy illustrated in the plot 1010 is measured or detected at various distances d from an output of the transducer by a sensor which may be the same as or similar to sensor 120 of FIG. 1.

The plot 1010 has a horizontal axis with a scale in time units (e.g., seconds), a first vertical axis with a scale in arbitrary intensity units, and a second vertical axis corresponding to transducer excitation voltage with a scale in voltage units (e.g., volts). Additionally, the plot 1010 includes a curve 1011 representative of acoustic energy measured at a distanced of about zero millimeters (mm) from the transducer output and a curve 1012 representative of acoustic energy measured at a distance d of about four hundred forty mm from the transducer output. The plot 1010 also includes a curve 1013 representative of acoustic energy measured at a distance d of about seven hundred fifty four mm from the transducer output and a curve 1014 representative of acoustic energy measured at a distance d of about one thousand fifty two mm from the transducer output.

As illustrated, the acoustic energy emitted by the transducer and measured by the sensor has an acoustic intensity which varies in response to a voltage level of electrical energy received by the transducer. In embodiments, the electrical energy corresponds to an excitation voltage. As also illustrated, the acoustic energy has an acoustic intensity which varies in response to the distance d from which the acoustic energy is measured from the transducer output. In particular, in the illustrated embodiment an increase in the voltage level of the electrical energy received by the transducer results in a corresponding increase in acoustic intensity of the acoustic energy emitted by the transducer. Additionally, in the illustrated embodiment the greater the distance d from which the acoustic energy is measured from the transducer output, the less the acoustic intensity of the acoustic energy. For example, the acoustic energy measured at a distance d of about seven hundred fifty four mm from the transducer output, as represented by curve 1014, has less of an acoustic intensity than the acoustic energy measured at about four hundred forty mm from the transducer output, as represented by curve 1012.

As further illustrated in plot 1010, a phase shift exists between each of the measured acoustic energies, as shown by line 1015. The phase shift may vary (i.e., increase or decrease) based on signal propagation delay over the distance d, measured with respect to the excitation voltage received by the transducer.

Figure 2:
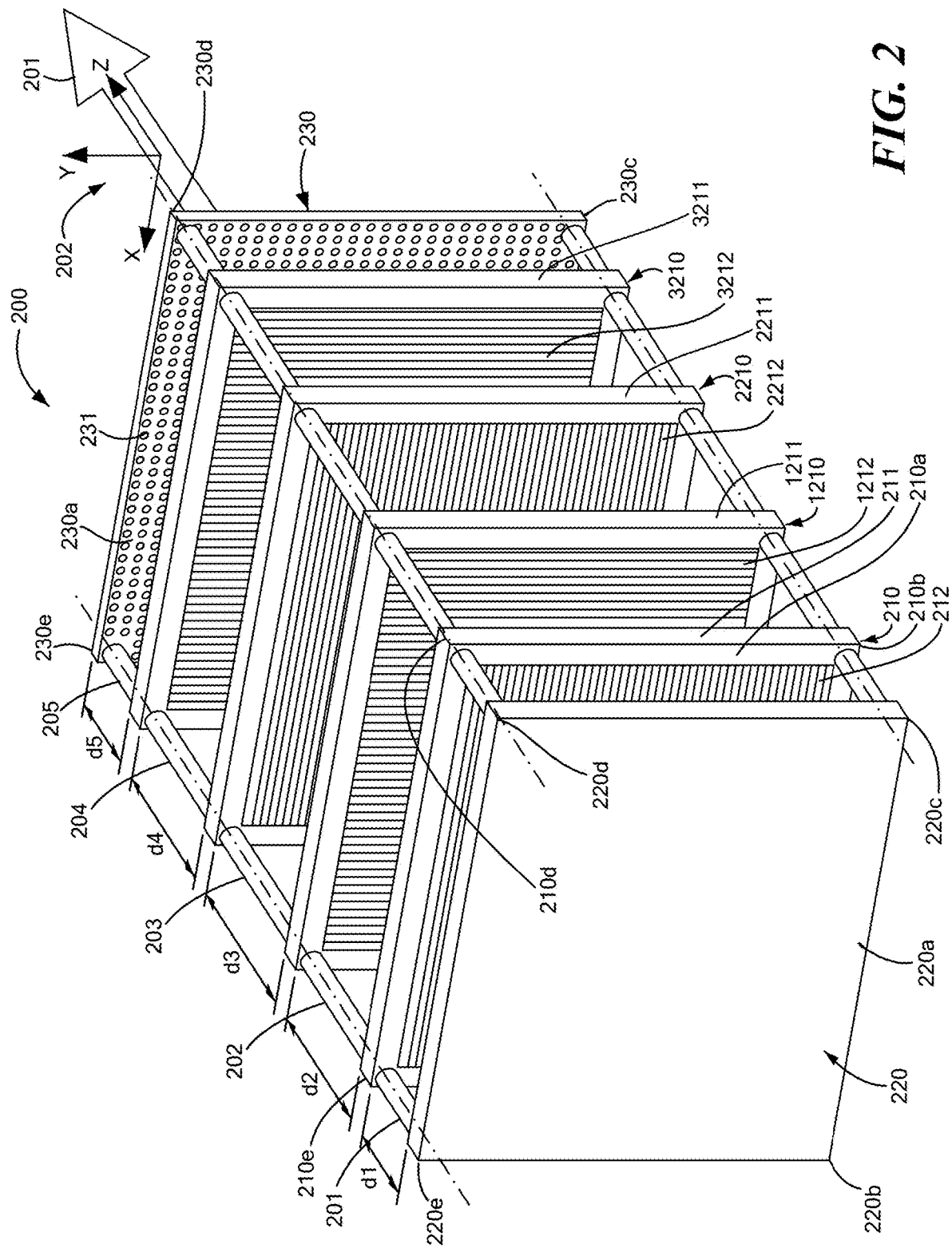
FIG. 2 is a block diagram of an example transducer according to a first embodiment of the disclosure.

Referring to FIG. 2, a block diagram of an example transducer 200 according to a first embodiment of the disclosure is shown. The transducer 200 includes a plurality of thermoacoustic (TA) frames (here, four TA frames 210, 1210, 2210, 3210), an acoustic reflector 220 and an acoustic coupler 230. The TA frames 210, 1210, 2210, 3210 are each disposed between the acoustic reflector 220 and the acoustic coupler 230, with the TA frames 210, 1210, 2210, 3210, the acoustic reflector 220 and the acoustic coupler 230 collectively forming a resonator in the illustrated embodiment. Each TA frame corresponds to a so-called "stage" of the transducer 200 according to the first embodiment. It follows that the transducer 200 is a 4-stage transducer.

The TA frames 210, 1210, 2210, 3210 each have at least one side (here, four sides) and opposing first and second surfaces. Additionally, the TA frames 210, 1210, 2210, 3210 each include one or more thermoacoustic (TA) sheets or media and a frame over which the TA sheets are disposed. For example, TA frame 210 has a first surface 210a, a second surface, sides 210b, 210c, 210d, 210e and corresponding edges. Additionally, TA frame 210 includes a TA sheet 212 and a frame 211 over which the TA sheet 212 is disposed.

In one embodiment, the TA sheets or media in transducer 200 (here, TA sheets 212, 1212, 2212, 3212) include single or multi-walled carbon nanotube sheets or films. In embodiments, the carbon nanotube sheets are conventional nanotube sheets such as those shown and described in L. Xiao et al., "Flexible, Stretchable, Transparent Carbon Nanotube Thin Film Loudspeakers," *Nano Letters*, vol. 8, pp. 4539-4545, 2008 (hereinafter "Xiao"), which is incorporated herein by reference. It is understood that carbon nanotube sheets generally have a "small" heat capacity (i.e., they typically do not store much heat). It is also understood that carbon nanotube sheets generally have an excellent coupling capability with surrounding air (i.e., they are capable of coupling energy into surrounding air). For example, the heat capacity per unit area of example single layer MWNT sheets disclosed in Xiao is about $8\times10^{-3}$ J/m$^2$·K and the MWNT sheets have an areal density of about 1-3 µg/cm$^2$.

In another embodiment, the TA sheets or media in transducer 200 include wire mesh, carbon fiber, carbon fabric, metalized polymer fiber or graphene. In a further embodiment, the TA sheets media include paper, yarn or polymer fiber. In embodiments, TA media including wire mesh, carbon fiber, carbon fabric, metalized fiber, graphene, paper, yarn, polymer fiber, etc. may function in a same or similar manner as TA sheets comprising carbon nanotube sheets, for example. The TA sheets or media may have an associated thickness. In one embodiment, the thickness related to the type of material or materials from which the TA sheets or media are provided.

The frames (e.g., 211, 1211, 2211, 3211) over which the TA sheets (e.g., 212, 1212, 2212, 3212) are disposed or otherwise provided may support the TA sheets. Additionally, the frames may also serve as a means for providing electrical energy to the TA sheets, as will be described further below.

In the illustrated embodiment, the TA frames 210, 1210, 2210, 3210 are each spaced apart from each other by a predetermined distance. In particular, TA frame 210 is spaced apart from TA frame 1210 by a distance d2, TA frame 1210 is spaced apart from TA frame 2210 by a distance d3, and TA frame 2210 is spaced apart from TA frame 3210 by a distance d4. Distances d2, d3, d4 may be the same or similar to each other in some embodiments. The TA frames 210, 1210, 2210, 3210 may be spaced apart from each other using spacers (e.g., 202, 203, 204) or another spacing means having dimensions based upon the predetermined distance. The spacers or spacing means may be provided from one or more thermally conductive materials to help dissipate heat produced during operation of the transducer 200, e.g., from the TA frames to the acoustic reflector 220.

The TA frames 210, 1210, 2210, 3210 are also arranged or stacked substantially parallel with respect to each other such that the first and second surfaces of TA frame 210 are substantially parallel with respect to the first and second surfaces of TA frames 1210, 2210, 3210. In order to avoid orientation issues and reduce, or ideally eliminate polarization effects, even TA frames (e.g., TA frames 210, 2210) and odd TA frames (e.g., TA frames 1210, 3210) may be crossed or rotated by a predetermined number of degrees (e.g., about ninety degrees) with respect to each other. For example, in embodiments TA sheets 212, 1212, 2212, 3212 or media of the TA frames 210, 1210, 2210, 3210 may include anisotropic sheets that are oriented in the draw direction. In some embodiments, in order to avoid polarization issues for acoustic signals or energies emitted by the TA frames 210, 1210, 2210, 3210 (as will be further discussed below), the TA frames 210, 1210, 2210, 3210 can be rotated by about ninety degrees such that anisotropic sheets of the TA frames 210, 1210, 2210, 3210 are substantially crossed.

The acoustic reflector 220 (e.g., an acoustic mirror), similar to the TA frames 210, 1210, 2210, 3210, has at least one side (here, four sides 220b, 220c, 220d, 220e) and opposing first and second surfaces (e.g., first surface 220a).

The acoustic reflector 220 is disposed proximate to a first portion of the transducer 200 near TA frame 210 and is spaced apart from the TA frame 210 by a distance d1. Additionally, the acoustic reflector 220 includes one or more acoustically reflective materials. For example, the acoustic reflector 220 may be provided from a sheet of an acoustically reflective material (e.g., a substantially "hard" plastic or metal material) having an associated thickness (e.g., a thickness of about 3 millimeters). The acoustically reflective sheet may be shaped (e.g., have a substantially flat or curved shape) depending upon the application in which the transducer 200 is provided. Additionally, the associated thickness of the acoustically reflective material may vary based upon the application and a desired level of reflectivity.

In some embodiments, the acoustically reflective materials are also thermally conductive materials (e.g., copper). Additionally or alternatively, the acoustically reflective materials may be coated with one or more thermally conductive materials. In such embodiments, the acoustic reflector 220 may function as a heat sink for the transducer 200, removing heat generated by the transducer 200 when it is in operation. This may potentially increase transducer performance, for example, by enabling the transducer 200 to operate for extended periods of time.

The acoustic coupler 230 (e.g., an output coupler) has at least one side (here, four sides 230*b*, 230*c*, 230*d*, 230*e*) and opposing first and second surfaces (e.g., surface 230*a*) and is disposed proximate to an output (i.e., a second opposing portion) of the transducer 200. The acoustic coupler 230 is also spaced apart from the TA frame 3210 by a distance d5 in the illustrated embodiment. The acoustic coupler 230 includes one or more acoustically semitransparent materials, or one or more other materials which may provide for transmittance of acoustic energy. For example, the acoustic coupler 230 may include or be provided from a sheet of a non-acoustically semitransparent material (e.g., stainless steel) that has perforations (e.g., 231) formed therein to provide for transmittance of acoustic energy. The perforations (i.e., holes) may form a periodic pattern in embodiments. Additionally, the holes may have an associated diameter (e.g., of about 0.15 millimeters). In embodiments, the associated diameter of the holes is selected to achieve a predetermined acoustic transmittance of the acoustic coupler 230. Additionally, the size and areal density of the holes may enable adjustment of the acoustic transmittance of the acoustic coupler 230. In embodiments, an acoustic intensity of the signal or energy emitted by the transducer (as will be discussed below), and a frequency bandwidth of the acoustic energy (as will also be discussed below), are based upon the transmittance of the acoustic coupler 230. It follows that the transmittance of the acoustic coupler 230 is generally an important parameter for the transducer 200.

The sheet of the non-acoustically semitransparent material from which the acoustic coupled 230 may include or be provided may also have an associated thickness (e.g., of about 0.13 millimeters). In embodiments, the thickness of the material may additionally or alternatively be selected to achieve the predetermined acoustic transmittance of the acoustic coupler 230.

The acoustic coupler 230 may also comprise acoustically semitransparent materials including a plastic film, a fiber screen, a wire screen, a metal or plastic sheet or a foil in some embodiments. The acoustically semitransparent materials may comprise perforations similar to those described above for the non-acoustically semitransparent sheet. Additionally, the acoustically semitransparent materials may have an associated thickness and be metallized or covered in one or more other materials (e.g., fabric, fiber and/or wire meshes). In one embodiment, the acoustic coupler 230, whether comprising acoustically semitransparent materials or other materials, has an acoustic transmittance which is greater than about zero percent and less than about one hundred percent at an emission frequency of acoustic energy emitted at the transducer output (i.e., a "second acoustic energy," as will be discussed below). As one example, it may be desirable for the acoustic coupler 230 to have an acoustic transmittance of about ninety percent at an emission frequency of about 110 kHz. In embodiments, the acoustic coupler 230 (and various characteristics of acoustic coupler 230, such as hole dimensions) may be selected to achieve a reasonable compromise between intensity of the acoustic energy emitted at the transducer output (as will be discussed below) and frequency bandwidth of the resonator formed from TA frames 210, 1210, 2210, 3210, the acoustic reflector 220 and the acoustic coupler 230 of the transducer 200. The transducer 200 may, for example, be provided in a device (e.g., a communications device or other transducer device) and the transducer output may be proximate to an output of the device.

During operation of transducer 200, each of the TA frames 210, 1210, 2210, 3210 is configured to emit or otherwise generate a first acoustic energy corresponding to a broadband acoustic signal in response to receiving electrical energy (e.g., a sinusoidal alternating current (AC) signal) from an energy source. For example, the TA sheets 212, 1212, 2212, 3212 in the TA frames 210, 1210, 2210, 3210 may be "heated" or excited with electrical energy and in response thereto emit the first acoustic energy. More particularly, when thermally excited with electrical energy, a temperature of the TA sheets 212, 1212, 2212, 3212 may change according to the received electrical energy and molecules (e.g., air molecules) around each of the TA sheets may vibrate due to the temperature changes of the TA sheets. The vibration of the molecules may cause the first acoustic energy to be emitted from each of the TA sheets 212, 1212, 2212, 3212 and, thus, the TA frames 210, 1210, 2210, 3210.

The first acoustic energy has an associated frequency and acoustic intensity. The frequency and acoustic intensity of the first acoustic energy may be based upon at least one of a current and/or a voltage level of the received electrical energy. Additionally, the frequency and acoustic intensity of the first acoustic energy may be based upon dimensions (e.g., a width, length, and/or thickness) and/or other properties (e.g., materials) of the TA frame (e.g., 210) from which the first acoustic energy is emitted. As one example, the frequency of the first acoustic energy may be about 10 kilohertz (kHz).

The electrical energy may be received by the TA sheets 212, 1212, 2212, 3212 from their respective frames 211, 1211, 2211, 3211, and the frames 211, 1211, 2211, 3211 may receive the electrical energy from a current and/or a voltage source (not shown). In one embodiment, the received electrical energy includes alternating current (voltage) or alternating current (voltage) superimposed on direct current (voltage) bias. In some embodiments, each of the TA sheets 212, 1212, 2212, 3212 receives substantially the same electrical energy from the current and/or a voltage source and emits a substantially same first acoustic energy. Further, in some embodiments, the electrical energy can be selectively turned on and off for selected ones of the TA sheets 212, 1212, 2212, 3212 in substantially real time when the transducer 200 is in operation. In embodiments, turning the electrical energy (or excitation voltage) on and off for selected TA frames 211, 1211, 2211, 3211 (and corresponding TA sheets 212, 1212, 2212, 3212) in transducer 200 enables the adjustment of intensity of acoustic energy or signals emitted by the transducer 200 at the transducer output. As one example, the electrical energy may be turned on for two of the TA frames 211, 1211, 2211, 3211 to provide for an acoustic signal having a first acoustic intensity, and the electrical energy may be turned on for three of the TA frames 211, 1211, 2211, 3211 to provide for an acoustic energy having a second acoustic intensity that is different from the first acoustic intensity. In embodiments, the second acoustic intensity is greater than the first acoustic intensity.

In embodiments, various modulation schemes may be superimposed on the electrical energy received by the TA sheets 212, 1212, 2212, 3212 (and TA frames 211, 1211, 2211, 3211). In embodiments, the modulation schemes (and signal modulation of the electrical energy) may be necessary for information transmission by the transducer 200 and be the same as or similar to modulation schemes which are widely used in diverse communication systems, for example. Detailed descriptions of the modulation schemes are not made herein. However, let it suffice here to say, that the modulation schemes may include analog modulation, digital modulation, amplitude modulation, phase modulation, frequency modulation, double-sideband modulation, or single-sideband modulation. Additionally, the modulation schemes may include vestigial sideband modulation, quadrature amplitude modulation, angle modulation, pulse modulation, phase-shift keying, frequency-shift keying, amplitude-shift keying, or quadrature amplitude modulation. Further, the modulation schemes may include pulse-amplitude modulation, pulse-width modulation, pulse-depth modulation, pulse-position modulation, pulse-code modulation, delta modulation, delta-sigma modulation, continuously variable slope delta modulation or pulse density modulation.

The first acoustic energy emitted by the TA frames 210, 1210, 2210, 3210 may be emitted in a direction perpendicular to an x-y plane of acoustic coupler 230 in accordance with coordinate axes 202 (i.e., in a positive z-direction). The first acoustic energy may also be emitted in a direction perpendicular to an x-y plane of acoustic reflector 220 (i.e., in a negative z-direction) and reflected off of the acoustic reflector 220 in a direction towards acoustic coupler 230.

The resonator formed from the TA frames 210, 1210, 2210, 3210, the acoustic reflector 220 and the acoustic coupler 230 is configured to emit or otherwise generate a second acoustic energy corresponding to a narrowband acoustic signal at the transducer output (as indicated by arrow 201) in response to the acoustic reflector 220 and the acoustic coupler 230 receiving the first acoustic energy. For example, the resonator may resonantly enhance the first acoustic energy emitted by the TA frames 210, 1210, 2210, 3210 through constructive interference, for example, in emitting or generating the second acoustic energy. The second acoustic energy has an associated beam profile which may be based upon a number of TA frames (or stages) in the transducer 200, as will be described further in connection with figures below. The beam profile of the second acoustic energy may also be based upon a size, shape and acoustic transmittance of the acoustic coupler 230 from which the second acoustic energy is emitted.

The frequency and acoustic intensity of the second acoustic energy, which may be a substantially "low" divergence, intense ultrasonic beam of acoustic energy in some embodiments, may be based upon at least one of a current and/or a voltage level of the received electrical energy. Additionally, the frequency and acoustic intensity of the second acoustic energy may be based upon dimensions and/or other properties (e.g., materials) of the acoustic reflector 220, the acoustic coupler and/or the TA frames 210, 1210, 2210, 3210. Further, the frequency and acoustic intensity of the second acoustic energy may correspond to the predetermined distance between the TA frames 210, 1210, 2210, 3210. In embodiments, the frequency and the predetermined distance are adjustable, as will be described further in connection with figures below. Further, in embodiments, one or more additional TA frames may be added to the transducer 200 to alter one or more characteristics (e.g., frequency and/or acoustic intensity) associated with the second acoustic energy.

In one embodiment, the second acoustic energy has a frequency between about 110 kilohertz (kHz) and about 114 kHz. Additionally, in one embodiment, the second acoustic energy has a bandwidth between about 4.4 kHz and about 6.4 kHz. Further, in one embodiment, the second acoustic energy has a maximum intensity of about 2 Pascal per Watt (Pa/W). It is understood that the second acoustic energy can be modulated in time and transmitted over substantial distances in air (e.g., distances of greater than about 20 m), for example, which is one example transmission or propagation medium over which the second acoustic energy may be transmitted.

The second acoustic energy may be emitted in a direction perpendicular to an x-y plane of acoustic coupler 230 in accordance with coordinate axes 202. Additionally, the second acoustic energy may be directed at an object, such as object 130 shown in FIG. 1, a receiver device, such as sensor 120 shown in FIG. 1, or any number of other objects and devices depending upon the application in which the transducer 200 is being used. Further, as discussed above, the emitted acoustic energy (here, the second acoustic energy) can be detected by a receiver device (e.g., 120) and processed, for example, by a processor in the receiver device (e.g., to detect and/or identify an object of interest).

Additional aspects of transducers according to the first embodiment are described below.

Figure 2A:
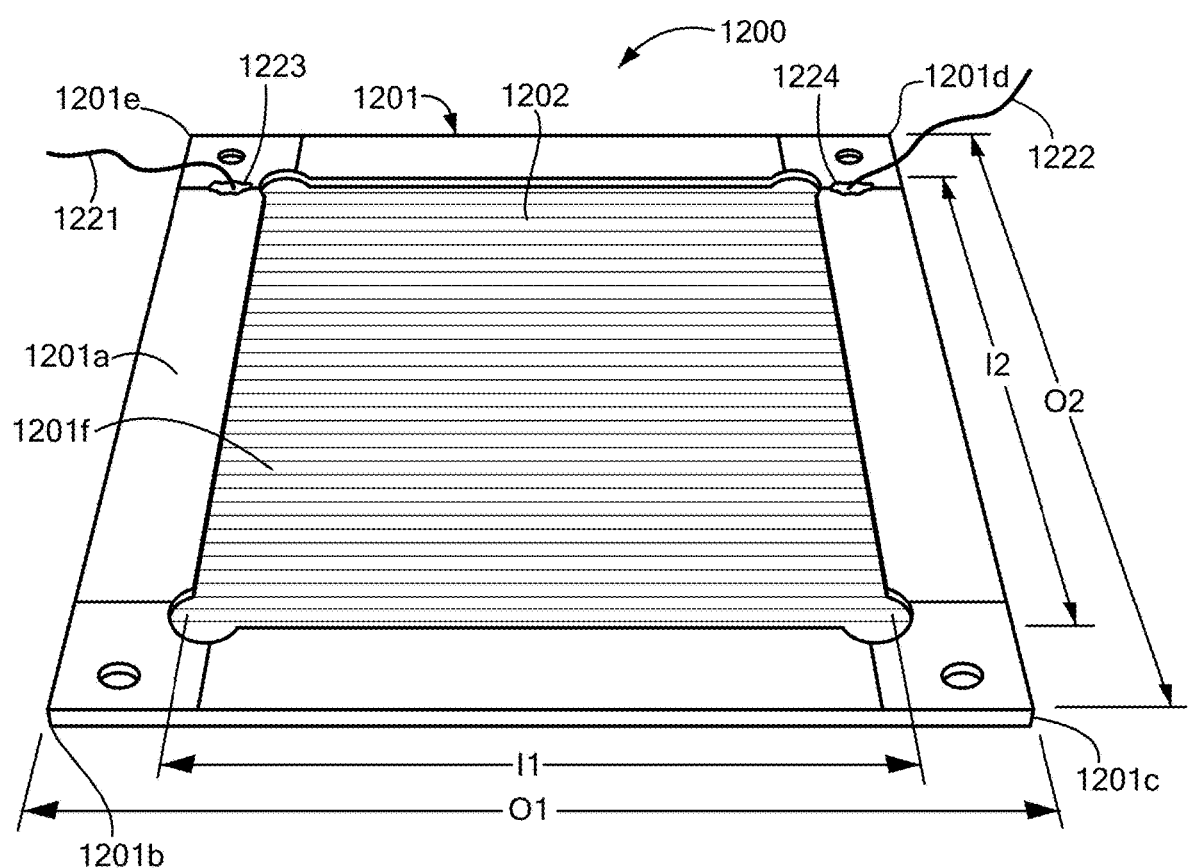
FIG. 2A is a pictorial representation of an example thermoacoustic frame that may be suitable for use in the transducer of FIG. 2.

Referring to FIG. 2A, an example TA frame 1200 including a TA sheet 1202 and a frame 1201 is shown. The TA sheet 1202, which may be the same as or similar to the TA sheets described above in connection with FIG. 2, is disposed over or otherwise coupled to the frame 1201. For example, the TA sheet 1210 may be stretched over an opening 1201f formed in the frame 1220 and coupled to one or more portions (here, at least a surface 1201a) of the frame 1201. The frame 1201 has respective edges 1201b, 1201c, 1201d, 1201e. The frame 1201 also has associated inner dimensions I1, I2 and outer dimensions O1, O2, with the inner dimensions I1, I2 and the outer dimensions O1, O2 corresponding to lengths and widths of the frame 1201 in the illustrated embodiment. In one embodiment, the frame 1201 has inner dimensions I1, I2 of about 40 mm×40 mm, and outer dimensions O1, O2 of about 50 mm×50 mm. It is understood that the inner dimensions I1, I2 and outer dimensions O1, O2 may be selected, for example, based on the application. Dimensions of the frame opening 1201f are related to the inner dimensions I1, I2 of the frame 1201, and dimensions of the TA sheet 1202 are related to the dimensions of the frame opening 1201.

In some embodiments, the frame 1201 is provided from one or more electrically conductive materials (e.g., copper). In other embodiments, the frame 1201 is provided from one or more electrically insulating materials and selected portions of the frame 1201 are coated with one or more electrically conductive materials. For example, the frame 1201 may be provided from or include a garolite material and be coated with a layer or sheet of copper, or another electrically conductive material. The frame 1201 has an associated thickness. In one embodiment in which the frame 1201 is provided from or includes a garolite material, the thickness of the frame 1201 is about 0.8 mm. In embodiments, the thickness of the frame 1201 corresponds to a conventional (or standard) thickness of a commercially available plate or material (e.g., a thickness of a commercially available relatively "thin" garolite plate.

The frame 1201 comprises electrical leads (here, leads 1221 and 1222) for receiving electrical energy from a current and/or a voltage source. As discussed above, the electrical energy received by the frame 1201 may be provided to the TA sheet 1202 and the TA sheet 1202 may, in turn, emit a first acoustic energy in response to receiving the electrical energy. In one embodiment, the leads 1221 and 1222 are soldered to contacts 1223, 1224 formed on a surface 1201a of the frame 1220. The contacts 1223, 1224 may, for example, be formed using an electrically conductive paint (e.g., a silver paint) and an amount of paint used to form the contacts 1223, 1224 may be selected to tune an electrical resistance associated with the frame 1220. As one example, the electrical resistance of the frame 1201 may be between about 1.5 kOhm and about 2.0 kOhm.

Figure 2B:
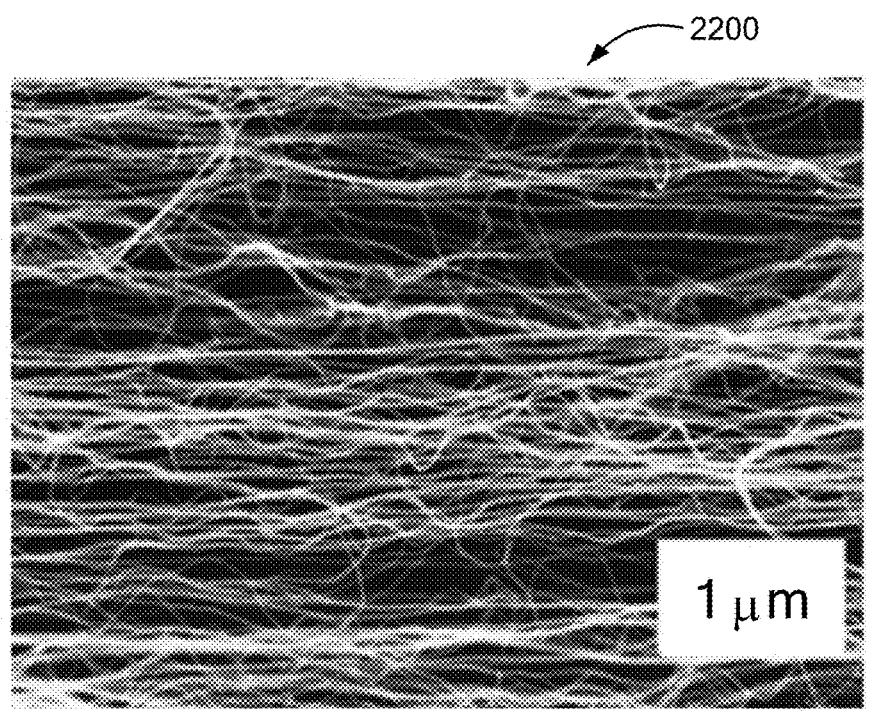
FIG. 2B is a pictorial representation of magnified carbon nanotubes in an example thermoacoustic sheet of a transducer.

Referring to FIG. 2B, an scanning electron microscope (SEM) image 2200 of magnified carbon nanotubes as may be provided in an example MWNT sheet which may be the same as or similar to TA sheet 1202 of FIG. 2A is shown. Porous multi-walled carbon nanotube sheets comprising these carbon nanotubes may, for example, be obtained by pulling a sidewall (and/or one or more other portions) of a multi-walled carbon nanotube forest. In one embodiment, the multi-walled carbon nanotube forest is pulled over a frame (e.g., 1201, shown in FIG. 2) to form a TA frame (e.g., 1200, shown in FIG. 2) comprising the frame and a TA sheet (e.g., 1202, shown in FIG. 2), with the TA sheet may be formed from the multi-walled carbon nanotube forest. In embodiments, the multi-walled carbon nanotube forest may be pulled using techniques which are the same as or similar to those shown and described in L. Xiao et al., "Flexible, Stretchable, Transparent Carbon Nanotube Thin Film Loudspeakers," *Nano Letters*, vol. 8, pp. 4539-4545, 2008, and/or in M. Zhang et al., "Strong, transparent, multifunctional, carbon nanotube sheets," *Science*, vol. 309, no. 5738, pp. 1215-1219 (2005), for example, which are incorporated herein by reference.

Figure 2C:
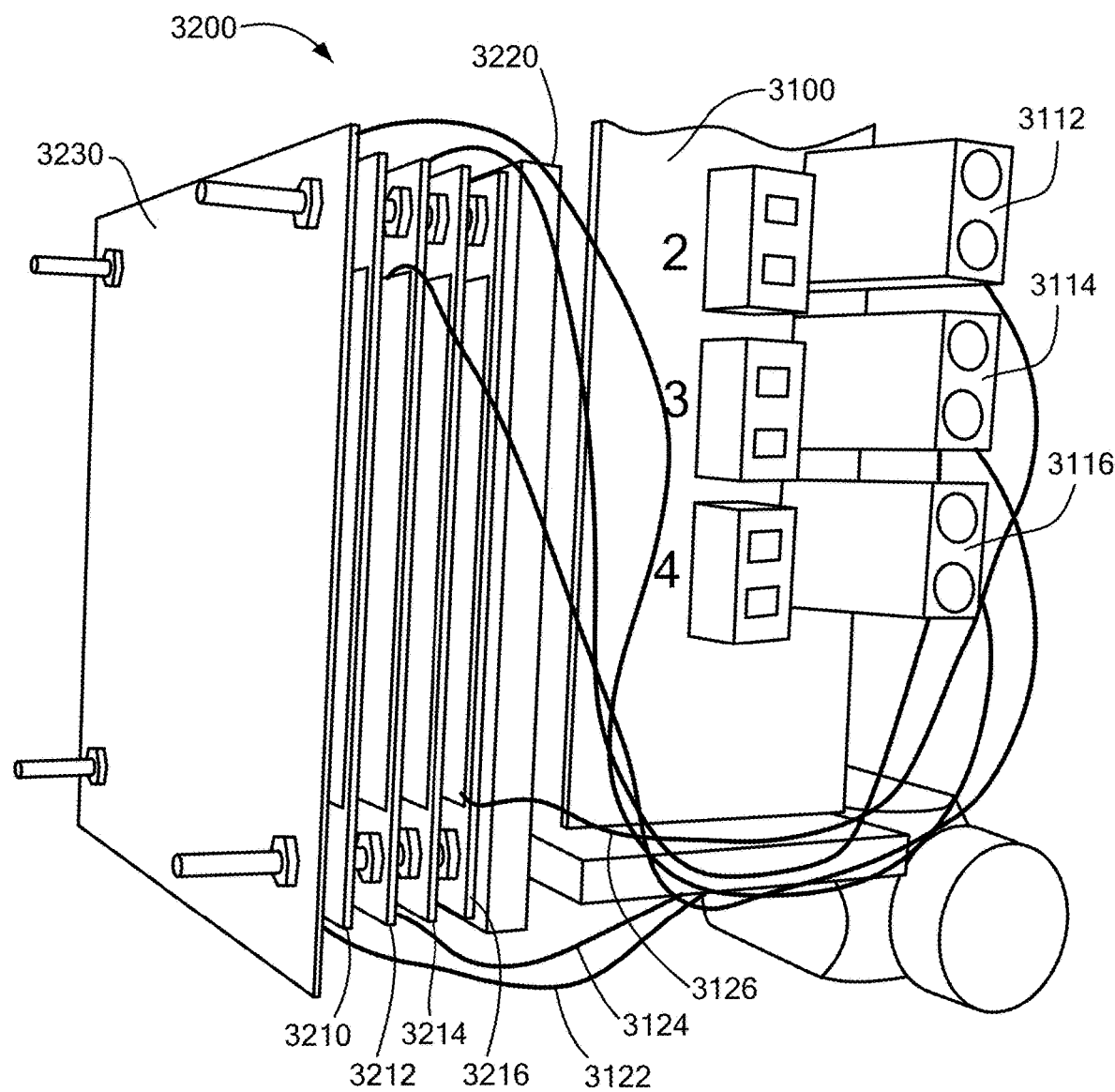
FIG. 2C is a pictorial representation of an example transducer coupled to a mounting surface.

Referring to FIG. 2C, an example 4-stage transducer 3200 according to the first embodiment is shown coupled to an example mounting surface, structure or holder 3100. An acoustic reflector 3220 of the transducer 3200 is disposed and coupled proximate to the mounting surface 3100 and an acoustic coupler 3230 of the transducer 3200 is distal from the mounting surface 3100. TA frames 3212, 3214, 3216, 3218 comprising TA sheets and associated frames are disposed between the acoustic reflector 3220 and the acoustic coupler 3230. Additionally electrical leads of the TA frames 3212, 3214, 3216, 3218 are coupled to corresponding connectors (e.g., 3112, 3114, 3116) on the mounting surface 3100 via wires (e.g., 3122, 3124, 3126). The connectors may be coupled to a current and/or a voltage source (not shown) and configured to receive electrical energy from the current and/or a voltage source.

In some embodiments, the transducer 3200 and other components associated with the transducer (e.g., mounting surface 3100) may be provided in an enclosure (not shown). The enclosure may, for example, be an enclosure associated with a device in which the transducer is provided. In embodiments, the enclosure may further provide for the transducer 3200 being suitable for use in a variety of applications and with a variety of transmission mediums.

Figure 3:
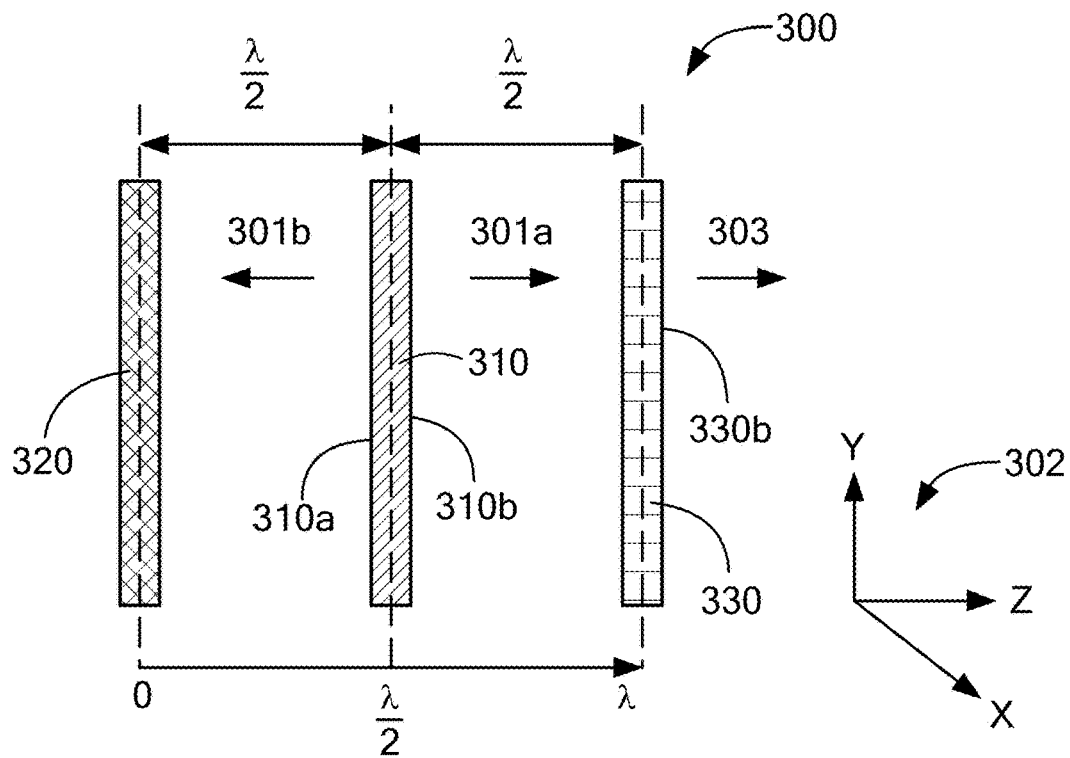
FIG. 3 is a side view of a first example configuration of a transducer according to the first embodiment of the disclosure.
Figure 3A:
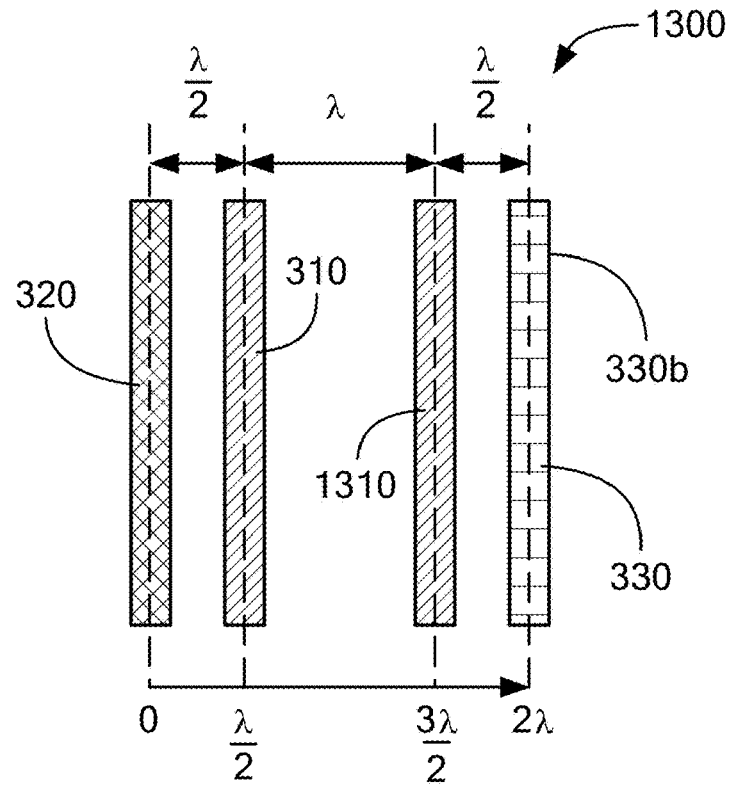
FIG. 3A is a side view of a second example configuration of a transducer according to the first embodiment of the disclosure.
Figure 3B:
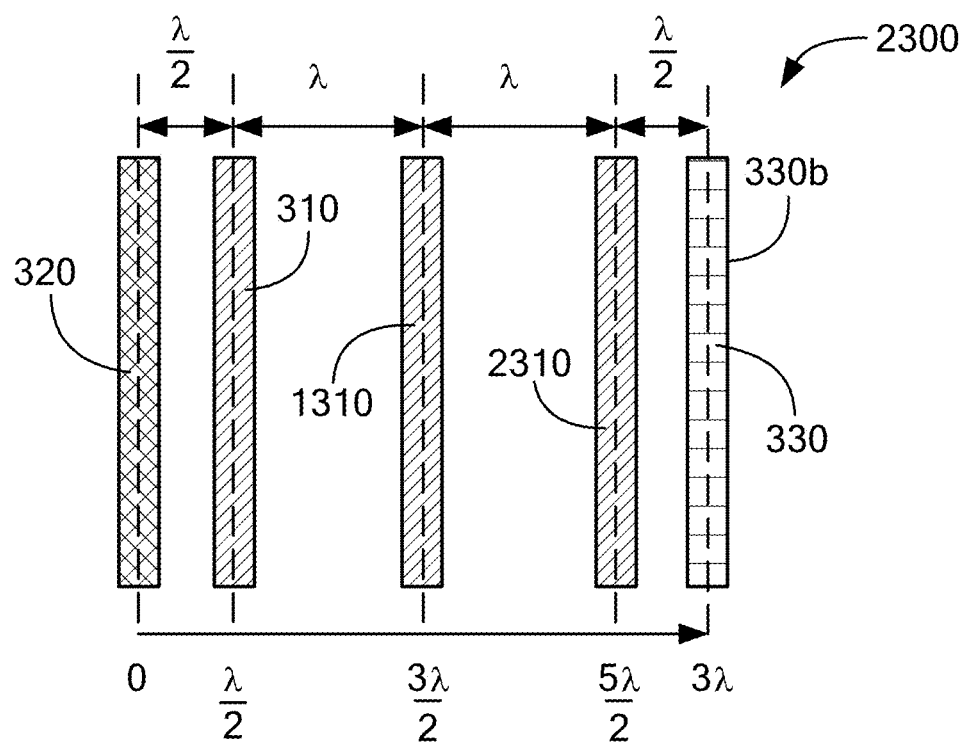
FIG. 3B is a side view of a third example configuration of a transducer according to the first embodiment of the disclosure.
Figure 3C:
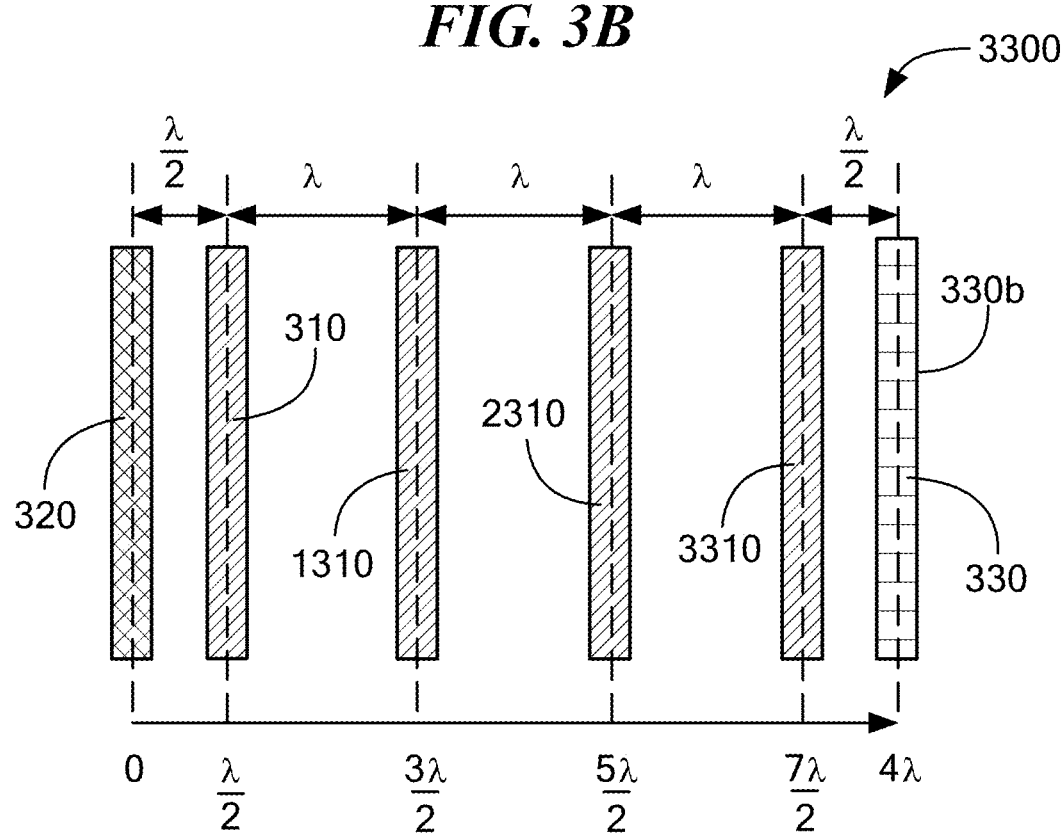
FIG. 3C is a side view of a fourth example configuration of a transducer according to the first embodiment of the disclosure.
Figure 3D:
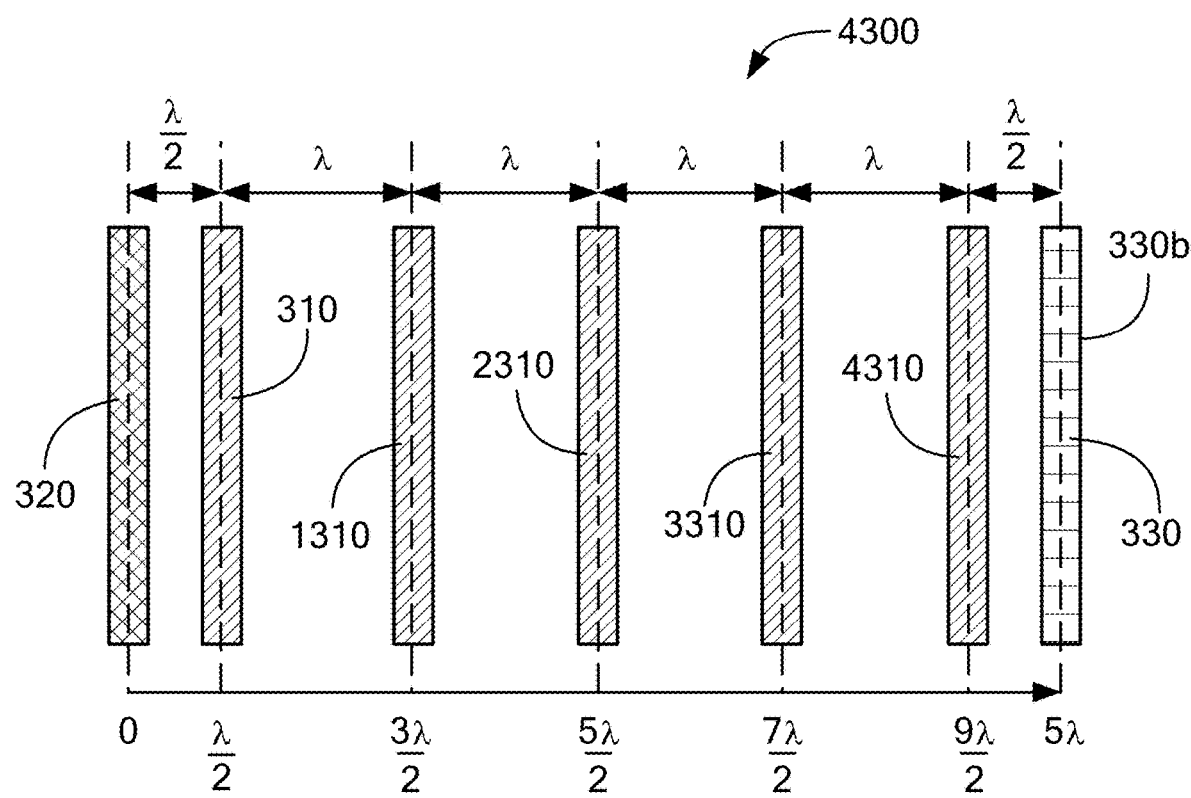
FIG. 3D is a side view of a fifth example configuration of a transducer according to the first embodiment of the disclosure.

Referring to FIGS. 3-3D, several further example configurations of transducers (e.g., 300, shown in FIG. 3) according to the first embodiment of the disclosure are shown.

Referring to FIG. 3, a first example transducer 300 (e.g., a narrow band 1-stage transducer) includes a TA frame 310, an acoustic reflector 320, and an acoustic coupler 330 which may be the same as or similar to the TA frames, acoustic reflectors and acoustic couplers described in figures above, respectively. The TA frame 310 is disposed between the acoustic reflector 320 and the acoustic coupler 330. In one embodiment, the transducer 300 is formed by coupling the acoustic reflector 320 to a first surface 310a of the TA sheet 310 and by coupling the acoustic coupler 330 to a second, opposing surface 310b of the TA sheet 310. The acoustic reflector 320 and the acoustic coupler 330 may be coupled to the TA sheet 310, for example, using spacers similar to the spacers shown in FIG. 2 or by using another coupling or spacing means. The acoustic coupler 330 may include perforations formed therein similar to the perforations (e.g., 231) formed in acoustic coupler 230 of FIG. 2.

The acoustic coupler 320 is spaced apart from the acoustic coupler 330 by a predetermined distance (here, $\lambda$). Additionally, a first spacing (here, $\lambda/2$) exists between the acoustic reflector 320 and TA frame 310 and a second spacing (here, $\lambda/2$) exists between the TA frame 310 and the acoustic coupler 330. In some embodiments, the predetermined distance between the acoustic reflector 320 and the acoustic coupler 330 is substantially equal to $n\lambda$, where $\lambda$ is a wavelength of the acoustic energy emitted by the transducer 300 at the transducer output and n is an integer number. Additionally, in some embodiments, such as the illustrated embodiment, the first and second spacings are substantially the same as each other.

During operation of the transducer 300, the TA frame 310 emits acoustic energy (here, a first acoustic signal or energy, as indicated by arrows 301a, 301b) in both positive and negative z directions in accordance with coordinate axes 302. This condition ensures that the phase of acoustic energy emitted by the TA frame 310 after a round trip in the resonator (i.e., a round trip between acoustic reflector 320 and acoustic coupler 330) is substantially equal to an initial phase of the first acoustic energy emitted by the TA frames 310. Constructive interference of acoustic energy emitted by the TA frame 310 and reflected in the transducer 300 (e.g., between acoustic reflector 320 and acoustic coupler 330) creates a standing wave pattern in the transducer 300.

A frequency f of the acoustic energy emitted (here, a second acoustic energy, as indicated by arrow 303) at the transducer output (here, surface 330b of acoustic coupler 330) is related to a wavelength $\lambda$ and a speed of sound c in a given transmission medium (e.g., air) by the equation $f=c/\lambda$. Additionally, the frequency f of the emitted acoustic energy (i.e., the second acoustic energy) corresponds to the predetermined distance between acoustic reflector 320 and acoustic coupler 330 in the illustrated embodiment. It follows that the frequency f of the emitted acoustic energy may be adjusted by adjusting $\lambda$, and the predetermined distance between acoustic reflector 320 and acoustic coupler 330. For example, in order to achieve a frequency f of about 110 kHz in air where the speed of sound at 20° C. is equal to about 343 m/s, a wavelength $\lambda$ of about 3.1 mm should be selected. Additionally, the predetermined distance between the between the acoustic reflector 320 and the acoustic coupler 330 should be equal to 1λ (here, about 3.1 mm). It is understood that λ can be affected by the variation of the speed of sound with temperature, pressure and, thus, the predetermined distance may need to be adjusted experimentally.

In some embodiments, the acoustic energy frequency f and the predetermined distance may be adjusted in substantially real time while the transducer 300 is in operation. The acoustic energy frequency may, for example, be adjusted from a first frequency to a second frequency that is substantially different than the first frequency by adjusting the predetermined distance from a first distance to a second distance that is substantially different than the first distance (e.g., using a linear motion system). Additionally, in some embodiments, the acoustic energy frequency may be adjusted by tilting the TA frame 310 in one or more directions according to coordinate system 302. The TA frame 310 may, for example, be moved or tilted by a motor in response to the motor receiving a control signal from a controller. In another embodiment, the TA frame 310 may be moved or tilted manually by a user.

The acoustic energy frequency f may further be adjusted by adjusting a current and/or a voltage level of the electrical energy received by the TA frame 310. Additionally, as discussed in figures above, the acoustic energy frequency f may be adjusted or selected based upon dimensions between acoustic reflector 320 and the acoustic coupler 330.

Further, a beam profile of the emitted acoustic energy or signal may be adjusted by adjusting at least one of: (a) the predetermined distance between acoustic reflector 320 and acoustic coupler 330, (b) the first spacing between the acoustic reflector 320 and TA sheet 310, (c) the second spacing between the TA sheet 310 and the acoustic coupler 330, and (d) a size, shape and/or acoustic transmittance of the acoustic coupler 330 from which the acoustic energy is emitted. For example, the beam profile may be adjusted from a first beam profile to a second beam profile that is substantially different than the first beam profile by adjusting the first spacing from a first distance to a second distance that is substantially different than the first distance. It should be appreciated that the first and second spacings may be adjusted in a similar manner as the predetermined distance discussed above.

The above described frequency and/or beam profile adjusting (or "tuning") features provide flexibility needed for building a family of transducers that can cover a broad frequency range. Moreover, the condition of the predetermined distance between acoustic reflector 320 and acoustic coupler 330 being equal to enables creation of a tunable transducer in which resonator length, beam profile and corresponding emission frequency may be adjusted in substantially real time. This feature is useful for ultrasonic imaging devices that increase spatial resolution while decreasing signal propagation length with increasing frequency. Both generally need to be controlled for imaging inhomogeneous materials. It is understood that such feature is not available from conventional piezoelectric transducers.

In one aspect of the disclosure, performance of transducer 300 (e.g., emission intensity of the acoustic energy emitted at the transducer output) may be improved (e.g., enhanced and strengthened) by increasing a number of TA frames (or stages) in the transducer 300 from one TA frame (here, TA frame 310) to two or more TA frames, as shown in the transducers of FIGS. 3A-3D, for example.

Referring to FIG. 3A, in which like elements of FIG. 3 are provided having like reference designations, a second example transducer 1300 (e.g., a 2-stage transducer) includes a plurality of TA frames (here, two TA frames 310, 1310), acoustic reflector 320 and acoustic coupler 330. The TA frames 310, 1310 are each disposed between the acoustic reflector 320 and acoustic coupler 330 and configured to emit a first acoustic energy in response to receiving electrical energy. Additionally, a resonator formed from the TA frames 310, 1310, the acoustic reflector 320 and the acoustic coupler 330 is configured to emit a second acoustic energy at the transducer output (here, surface 330b of acoustic coupler 330) in response to the acoustic reflector 320 and the acoustic coupler 330 receiving the first acoustic energy.

In the illustrated embodiment, TA frame 310 is spaced apart from TA frame 1310 by a distance λ. Further, a distance 2λ exists between acoustic reflector 320 and acoustic coupler 330, with TA frame 310 spaced apart from acoustic reflector 320 by a distance λ/2 and TA frame 1310 spaced apart from acoustic coupler 330 by a distance λ/2. As discussed above, λ is a wavelength of the acoustic energy emitted by the transducer at the transducer output (i.e., the second acoustic energy), and a frequency of the acoustic energy is related to λ and the speed of sound c in a given transmission medium by the equation f=c/λ. It follows that the frequency of the acoustic energy emitted at the transducer output may be adjusted by adjusting a distance between TA frame 310, acoustic reflector 320, acoustic coupler 330 and TA frame 1310 (i.e., the transducer components). For example, the frequency may be adjusted from a first frequency of about 110.6 kHz to a second frequency of about 55.3 kHz by adjusting λ from about 3.1 mm to about 6.2 mm, and a respective distance between the transducer components (e.g., 2λ between components 320, 330) for the configuration shown in FIG. 3A.

In one embodiment, a beam profile of the acoustic energy emitted at the transducer output is based, at least in part, upon a number of TA frames (e.g., 1, 2, 3, 4, etc.) in a transducer (e.g., 1300) according to the first embodiment. It follows that the acoustic energy emitted by transducer 1300 of FIG. 3A may have a different beam profile than the acoustic energy emitted by transducer 300 of FIG. 3 and transducers described in figures below.

Referring to FIG. 3B, a third example transducer 2300 (e.g., a 3-stage transducer) includes TA frames 310, 1310, 2310, acoustic reflector 320 and acoustic coupler 330. TA frames 310, 1310, 2310 are each disposed between acoustic reflector 320 and acoustic coupler 330 and are spaced apart from each other by a distance λ in the illustrated embodiment. Additionally, a distance 4λ exists between acoustic reflector 320 and acoustic coupler 330, with TA frame 310 spaced apart from acoustic reflector 320 by a distance λ/2 and TA frame 2310 spaced apart from acoustic coupler 330 by a distance λ/2. A frequency of the acoustic energy emitted at the transducer output (i.e., the second acoustic energy) may be adjusted by adjusting λ and a distance between two or more of TA frames 310, 1310, 2310. In some embodiments, the distance between each of the TA frames 310, 1310, 2310 is substantially the same. In such embodiments, the distance between each of the TA frames 310, 1310, 2310 is adjusted by a substantially same amount when adjusting the frequency of the acoustic energy emitted at the transducer output. A beam profile of the emitted acoustic energy may be adjusted by adjusting a distance between the TA frame 310 and acoustic reflector 320 and/or a distance between TA frame 2310 and acoustic coupler 330.

Referring to FIG. 3C, a fourth example transducer 3300 (e.g., a 4-stage transducer) includes TA frames 310, 1310, 2310, 3310, acoustic reflector 320 and acoustic coupler 330.

TA frames 310, 1310, 2310, 3310 are each disposed between acoustic reflector 320 and acoustic coupler 330 and are spaced apart from each other by a distance λ. Additionally, a distance 3λ exists between acoustic reflector 320 and acoustic coupler 330, with TA frame 310 spaced apart from acoustic reflector 320 by a distance λ/2 and TA frame 3310 spaced apart from acoustic coupler 330 by a distance λ/2. A frequency of acoustic energy emitted at the transducer output (here, surface 330b of acoustic coupler 330) may be adjusted by adjusting λ and the corresponding distances between two or more of TA frames 310, 1310, 2310, 3310. The frequency of the emitted acoustic energy may also be adjusted by adjusting the distance between TA frame 310 and acoustic reflector 320 and/or the distance between TA frame 2310 or TA frame 3310 and the acoustic coupler 330 in embodiments.

Referring to FIG. 3D, a fifth example transducer 4300 (e.g., a 5-stage transducer) includes TA frames 310, 1310, 2310, 3310, 4310, acoustic reflector 320 and acoustic coupler 330. TA frames 310, 1310, 2310, 3310, 4310 are each disposed between acoustic reflector 320 and acoustic coupler 330 and are spaced apart from each other by a distance λ. Additionally, a distance 5λ exists between acoustic reflector 320 and acoustic coupler 330, with TA frame 310 spaced apart from acoustic reflector 320 by a distance λ/2 and TA frame 4310 spaced apart from acoustic coupler 330 by a distance λ/2. A frequency of acoustic energy emitted at the transducer output (here, surface 330b of acoustic coupler 330) may be adjusted by adjusting λ and the corresponding distances between two or more of TA frames 310, 1310, 2310, 3310, 4310. The frequency of the emitted acoustic energy may also be adjusted by adjusting the distance between acoustic reflector 320 and TA frame 310, and/or the distance between TA frame 4310 and the acoustic coupler 330.

In embodiments, one or more of the TA frames in the example transducers shown in FIGS. 3-3D may be selectively turned on or off to control generation and emission of acoustic energy by the transducers. Additionally, in embodiments the example transducers shown in FIGS. 3-3D can be configured to operate as N-stage transducers by selectively turning on or off selected TA frames in the transducers, with N corresponding to a number of active stages (i.e., stages that are turned on) in the transducers. For example, transducer 4300 of FIG. 3D can be configured to operate as either a 1, 2, 3, 4 or 5-stage transducer by selectively turning on or off TA frames 310, 1310, 2310, 3310, 4310 in transducer 4300. In embodiments, the acoustic emission intensity of the transducers is based, at least in part, on the number of active stages.

It should be appreciated that the example transducers of FIGS. 3-3D described above are but several of many potential configurations of transducers according to the first embodiment of the disclosure. For example, while the TA frames of the transducers of FIGS. 3A-3D are shown as substantially equidistantly spaced apart from each other by a distance λ in FIGS. 3A-3D, it should be appreciated that in some embodiments the TA frames may be spaced apart from each other by varying distances, e.g., depending upon a frequency (or frequencies) of the acoustic energy to be emitted at the transducer output. Dimensions of the TA frames, acoustic reflectors and acoustic couplers (e.g., a width, length, and/or thickness) may also be adjusted to provide optimum device performance, e.g., frequency and frequency bandwidth, intensity of emitted signal, beam divergence, etc.

Plots illustrating performance characteristics of example TA frames and example transducers according to the first embodiment are shown in FIGS. 4-6A.

Figure 4:
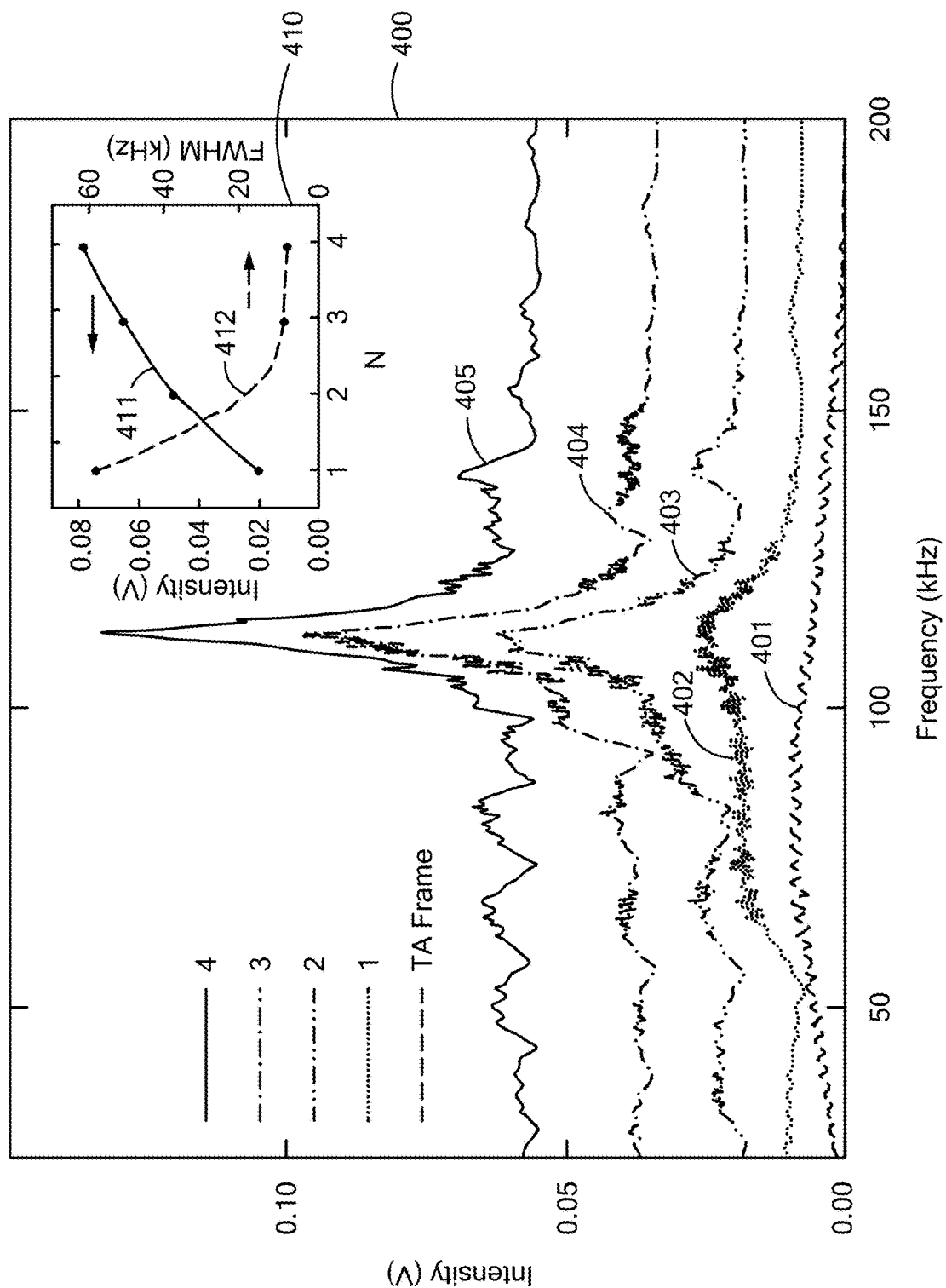
FIG. 4 shows illustrative signal waveforms of acoustic energy that may be emitted by an example thermoacoustic frame and example transducers according to the disclosure.

Referring to FIG. 4, a plot 400 shows frequency dependencies of acoustic energy emitted (i.e., ultrasonic emission) by an example TA frame and example transducers according to the first embodiment of the disclosure versus acoustic intensity of the emitted acoustic energy. The acoustic energy is emitted at an output of the TA frame and transducers, respectively. Additionally, a subplot 410 in FIG. 4 shows dependence of full width at half maximum (FWHM) and acoustic intensity of the emitted acoustic energy and an emission peak of the emitted acoustic energy on a number N of stages (here, 1, 2, 3 or 4) in the transducer embodiments shown in FIGS. 2 and 2C, for example. The TA frame may be the same as or similar to the TA frame shown in FIG. 2A in embodiments. In the embodiments shown in FIGS. 2 and 2C, each stage of the illustrated transducers include a TA frame (e.g., 210, shown in FIG. 2) disposed between an acoustic reflector (e.g., 220, shown in FIG. 2) and an acoustic coupler (e.g., 230, shown in FIG. 2) forming a resonator. The TA frame of each stage may be arranged in a stack of TA frames, for example, in embodiments in which the transducer includes more than one stage, as illustrated in FIGS. 2, 2C and 3A-3D, for example. In embodiments, the 1, 2, 3 and 4-stage transducers depicted by plots 400 and 1400 may be the same as or similar to the 1, 2, 3 and 4-stage transducers shown in FIGS. 3-3C, respectively. Curves 401, 402, 403, 404, 405 shown in plot 400 are shifted along the vertical axis in the plot 400.

As illustrated in plot 400, the acoustic energy emitted by the 1-stage transducer, as depicted by curve 402, has a broad emission peak with a maximum frequency near about 114 kHz and a FWHM of about 57.3 kHz. As also illustrated in plot 400, the acoustic energy emitted by the 4-stage transducer, as depicted by curve 405, has an emission peak with a maximum frequency near about 113.5 kHz and a FWHM of about 6.4 kHz. In embodiments, a position of the emission peak (i.e., a main emission peak) of the acoustic energy slightly depends on a number of stages in the transducer. Additionally, in embodiments a frequency shift of the acoustic energy may be caused by small variations of resonator dimensions (e.g., the distances between TA frames and other device components) that may be difficult to avoid. As further illustrated in plot 400, the emission peaks of the emitted acoustic energy have a width related to the number N of stages in the transducers. In particular, the width of the emission peak substantially decreases in response to an increasing number N of stages in the transducers.

Curves 402, 403, 404 and 404 in plot 400 and curve 411 in subplot 410 show that the acoustic intensity of the emitted acoustic energy is substantially proportional to a number N of stages in the transducers (here, with N=1, 2, 3, or 4). Additionally, curve 412 in subplot 410 shows that the FWHM of the emitted acoustic energy is related to the number N of stages in the transducer. In particular, the FWHM of the emitted acoustic energy substantially decreases in response to an increasing number N of stages in the transducer.

It is also observed in plot 400 and subplot 410 that the "quality of resonator" (i.e., a ratio of a maximum emitted frequency to FWHM of the acoustic energy) is related to the number N of stages in the transducers. For example, it may be said that the acoustic energy emitted by the 1-stage transducer is of a lower quality than the acoustic energy emitted by each of the 2, 3 and 4 stage transducers. Such may be due to the relatively small gain provided by the single TA frame in the 1-stage transducer and the substantially high loses from the example acoustic coupler (e.g., 330, shown in FIG. 3) provided in the 1-stage transducer. The acoustic coupler provided in the 1-stage transducer has a substantially high acoustic transmittance (~90% near about 110 kHz).

In one embodiment, at least one the TA frame(s), acoustic coupler, and acoustic reflector provided in the transducers may be moved or shifted to adjust one or more characteristics (e.g., an acoustic intensity) of the emitted acoustic energy illustrated by plot 400 and subplot 410. For example, the acoustic coupler (e.g., 330) in the 4-stage transducer (e.g., 3300, shown in FIG. 3C) may shifted in a Z direction away from a selected one of the TA frames (e.g., 3310) in the transducer by a predetermined amount (e.g., about 28%) to adjust the acoustic intensity of acoustic energy emitted by the transducer. In embodiments, the predetermined amount of the shift is determined experimentally to obtain a maximum intensity of the emitted acoustic energy.

Figure 4A:
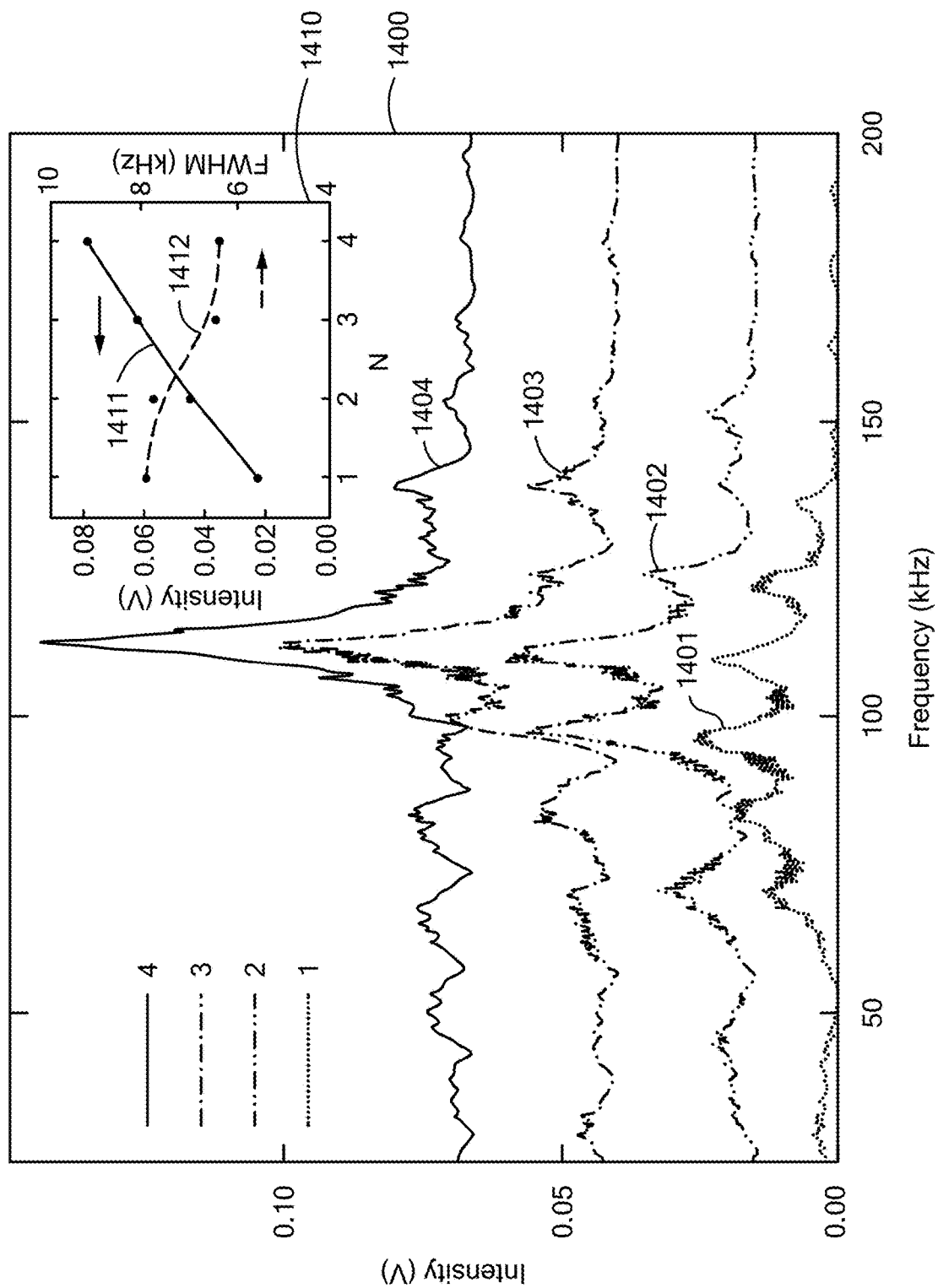
FIG. 4A shows additional illustrative signal waveforms of acoustic energy that may be emitted by example transducers according to the disclosure.

Referring to FIG. 4A, a plot 1400 shows frequency dependencies of acoustic energy emitted (i.e., ultrasonic emission) by an example transducer according to the first embodiment (e.g., 3300, shown in FIG. 3C) with a varying number N of active or powered stages versus acoustic intensity of the emitted acoustic energy. As used herein, an "active" or "powered" stage refers to a TA frame that receives electrical energy (e.g., an AC voltage) during operation of the transducer and, in turn, converts the electrical energy to acoustic energy. Additionally, a subplot 1410 in FIG. 4A shows dependence of full width at half maximum (FWHM) and acoustic intensity of the emitted acoustic energy and an emission peak of the emitted acoustic energy on the number of active or powered stages N (here, 1, 2, 3 or 4) in the transducer. Curves 1401, 1402, 1403, 1404 shown in plot 1400 are shifted along the vertical axis in the plot 1400.

As illustrated in plot 1400, an emission spectrum of the emitted acoustic energy is substantially related to the number N of active or powered stages in the transducer, as depicted by curves 1401, 1402, 1403, and 1404, which correspond to acoustic energies emitted by 1-, 2-, 3- and 4-stage transducers, respectively. Additionally, as illustrated in plot 1400 and subplot 1410, acoustic intensity and FWHM of the emitted acoustic energy is related to the number N of active stages in the transducer (e.g., as depicted by curves 1411, 1412 in subplot 1410).

For a 4-stage transducer (e.g., 3300, shown in FIG. 3C) comprising a single active or powered TA frame (e.g., 3310, shown in FIG. 3C) located at a distance of about $\lambda/2$ from an acoustic reflector (e.g., 320, shown in FIG. 3C) and a distance of about $7\lambda/2$ from an acoustic coupler (e.g., 330, shown in FIG. 3C) in the transducer, as depicted by curve 1401 in plot 1400, several intense resonances are observed in the region of interest, i.e., a frequency range of intense acoustic emission. The observed spectrum can be attributed to the superposition of two acoustic energy contributions with intensity maxima near fc and nfc/7, where n is an integer number. Adding a second active TA frame (e.g., 1310, shown in FIG. 3C) located at a distance of about $3\lambda/2$ from the acoustic reflector and a distance of about $5\lambda/2$ from the acoustic coupler to the 4-stage transducer substantially increases the acoustic intensity of the emission peak (i.e., a main resonant peak) by factor of about two and somewhat diminishes side bands, as depicted by curve 1042 in plot 1400. The foregoing may be due, at least in part, to $nf_c/3$ and $nf_c/5$ contributions of the first and second active TA frames where $f_c$ is the main (or center) resonant frequency and n is an integer number (i.e., 1, 2, 3, etc.).

The addition of further active TA frames to the transducer reveals similar trends, as shown by curves 1403, 1404 in plot 1400. Constructive interference conditions are fulfilled for the emission peak of the acoustic energy emitted by the transducer. The emission peak has an acoustic intensity that generally increases in response to an increasing number N of active TA frames in the transducer. As illustrated in plot 1410, the FWHM of the emission peak does not substantially depend on a number N of active TA frames in the transducer. In one embodiment, the width of the emission peak may be controlled by adjusting dimensions of one or more portions (e.g., TA frames) of the transducer.

In embodiments, the emission intensity of the transducer reveals an approximately parabolic dependence on supplied or applied ac voltage $U_1$ and can therefore be normalized by the supplied voltage that for a first ac harmonic is equal to $2U_1 U_0/R$, where $U_0 = U_1$ and both $U_0$ and $U_1$ correspond to dc offsets, and R corresponds to device resistance (more particularly, resistance of active TA frames of the transducer). In embodiments, the normalized intensity generally depends on the number N of active TA frames in the transducer. For single stage (i.e., 1-Stage) transducer embodiments, for example, the normalized intensity was found to be substantially constant over a broad voltage range, as illustrated by curves 1101 and 1106 shown in plot 1100 of FIG. 11, for example. Referring briefly to FIG. 11, curves 1101, 1102, 1103, 1104 (which are also labeled as T1, 1; T1, 2; T1, 3; T1, 4, respectively in the plot legend) correspond to 1-, 2-, 3- and 4-stage transducers according to the first embodiment of the disclosure, respectively. Additionally, curves 1105 and 1106 (which are also labeled as T2, 1 and T2, 3, respectively in the plot legend) correspond to 1- and 3-stage transducers according to a second embodiment of the disclosure, respectively. Transducers according to the second embodiment of the disclosure are described more fully in connection with FIGS. 7-11. However, let it suffice here to say that transducers according to the second embodiment include an increased number of acoustic couplers compared to transducers according to the first embodiment, for example.

As illustrated in plot 1100, increasing the number N of active TA frames in the transducer embodiments according to both the first and second embodiments of the disclosure results in an appearance of voltage and intensity dependence with maximum intensity of the transducers followed by an intensity drop at relatively high-applied voltages. In embodiments, the intensity drop signifies deterioration of signal generation efficiency of the transducers. In embodiments, such deterioration is likely caused by intense heat generation at the high-applied voltages that exceeds heat dissipation capabilities of the transducers and therefore interferes with transducer operation. Improved heat dissipation was achieved in transducer embodiments according to the second embodiment of the disclosure, for example. It was determined that at relatively modest applied voltages the transducer embodiments behave as a linear (or substantially linear) system that can adjust emission intensity by changing the number N of active TA frames in the transducers. It is understood that the heat dissipation capabilities of the transducers can be further improved using heat dissipation techniques known to those of ordinary skill in the art.

Returning now to FIG. 4A, in order to evaluate sound pressure level (SPL) of the acoustic energy emitted by the transducer, the acoustic intensity of the emitted acoustic energy was compared with acoustic energy emitted by a conventional piezoelectric transmitter. It was found that the SPL level for the transducer exceeds about 2 Pa/W (99.4 dB/W) at a distance of about 150 mm from an output of the transducer. Due to the design flexibility of transducers according to the disclosure, the SPL level of the transducers can be increased by adding emission stages (i.e., TA frames) as needed for reaching particular ultrasonic intensities.

Figure 5:
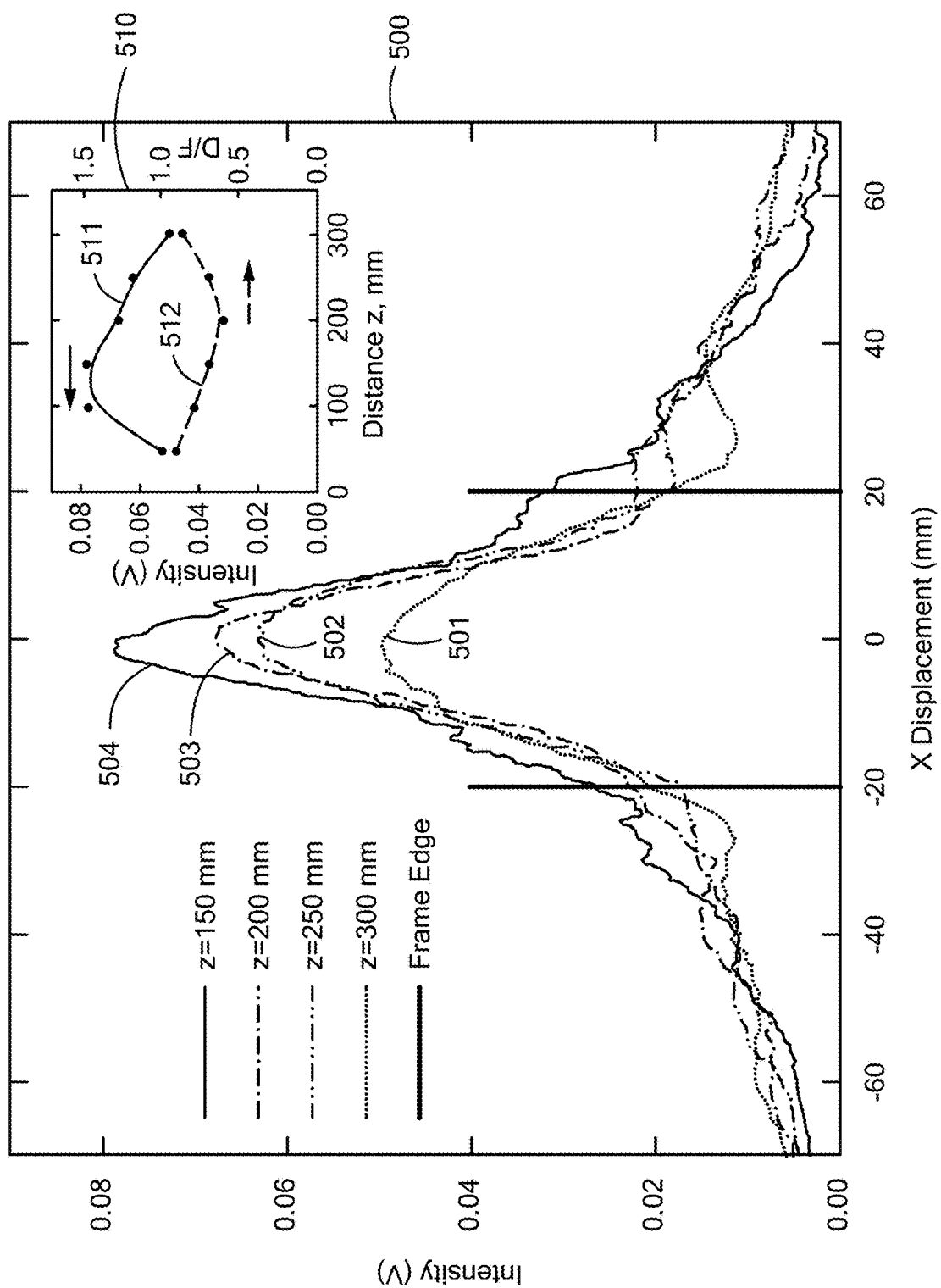
FIG. 5 shows illustrative signal waveforms of acoustic energy that may be emitted by example transducers according to the disclosure.

Referring to FIG. 5, a plot 500 shows frequency dependencies of acoustic energy emitted by an example 4-stage transducer according to the first embodiment of the disclosure (e.g., 3300, shown in FIG. 3C) versus acoustic intensity of the emitted acoustic energy. The acoustic energy is measured at various distances d from an output of the transducer by a sensor (e.g., a microphone) which may be the same as or similar to sensor 120 of FIG. 1. Additionally, a subplot 510 in FIG. 5 shows dependence of acoustic intensity of the emitted acoustic energy at X, Y=0 from a center point of the transducer output (i.e., at a position of X=0, Y=0 and Z=0 of the transducer output) and diameter D normalized by size of transducer TA frame opening F at the various distances d. In embodiments, the TA frames of the transducer may be the same as or similar to TA frame 1200 shown in FIG. 2A, for example, which has an opening 1201f formed therein. As discussed above, dimensions of the TA frame opening 1201f are related to inner dimensions I1, I2 of frame 1201 of TA frame 1200. As one example, frame 1201 may have inner dimensions I1, I2 of about 40 mm×40 mm, and the TA frame opening 1201f may correspond to the inner dimensions I1, I2. As also discussed above, the TA sheet 1210 (e.g., a MWNT sheet) disposed or suspended over TA frame opening 1201f is configured to emit an acoustic energy or signal.

For plot 500 of FIG. 5, X-I and Y-I scans of the emitted acoustic energy were obtained at stepwise displacements in X and Y planes with respect to the transducer output, with the origin of the displacements (i.e., an X Displacement of about 0 mm) corresponding to a center point of the transducer output. It was found that the strongest acoustic energy signal at X=Y=0 is observed near a distance d of about of 150 mm from the transducer output, with the acoustic energy dropping in magnitude of acoustic intensity at higher and lower distances from the transducer output, as shown by curves 501, 502, 503 and 504 in plot 500.

Measurements in both horizontal X (Y=0) and vertical Y (X=0) directions at distances greater than or less than about 150 mm from the transducer output revealed very similar beam profiles with intense bell-like center peak and several side lobes. The beam diameter D was estimated as FWHM of a center peak, normalized by the size of a TA frame opening F.

Horizontal X-I scans for the 4-stage transducer are shown in subplot 510 as a function of the various distances d from the transducer output. Distances above about 150 mm are associated with the Fresnel region which becomes far field at higher distances. As illustrated by curves 511 and 512 in subplot 510, a narrowest point of the beam (a so-called "beam waist") is observed at a distance of about 200 mm from the transducer output and is equal to about 60% of the frame size. Decreasing the number N of active TA frames or stages in the transducer (e.g., from 4-stages to 3-stages) slightly changes the beam profile of emitted acoustic energy while substantially decreasing the acoustic intensity of the emitted acoustic energy, as shown in FIG. 5A.

Figure 5A:
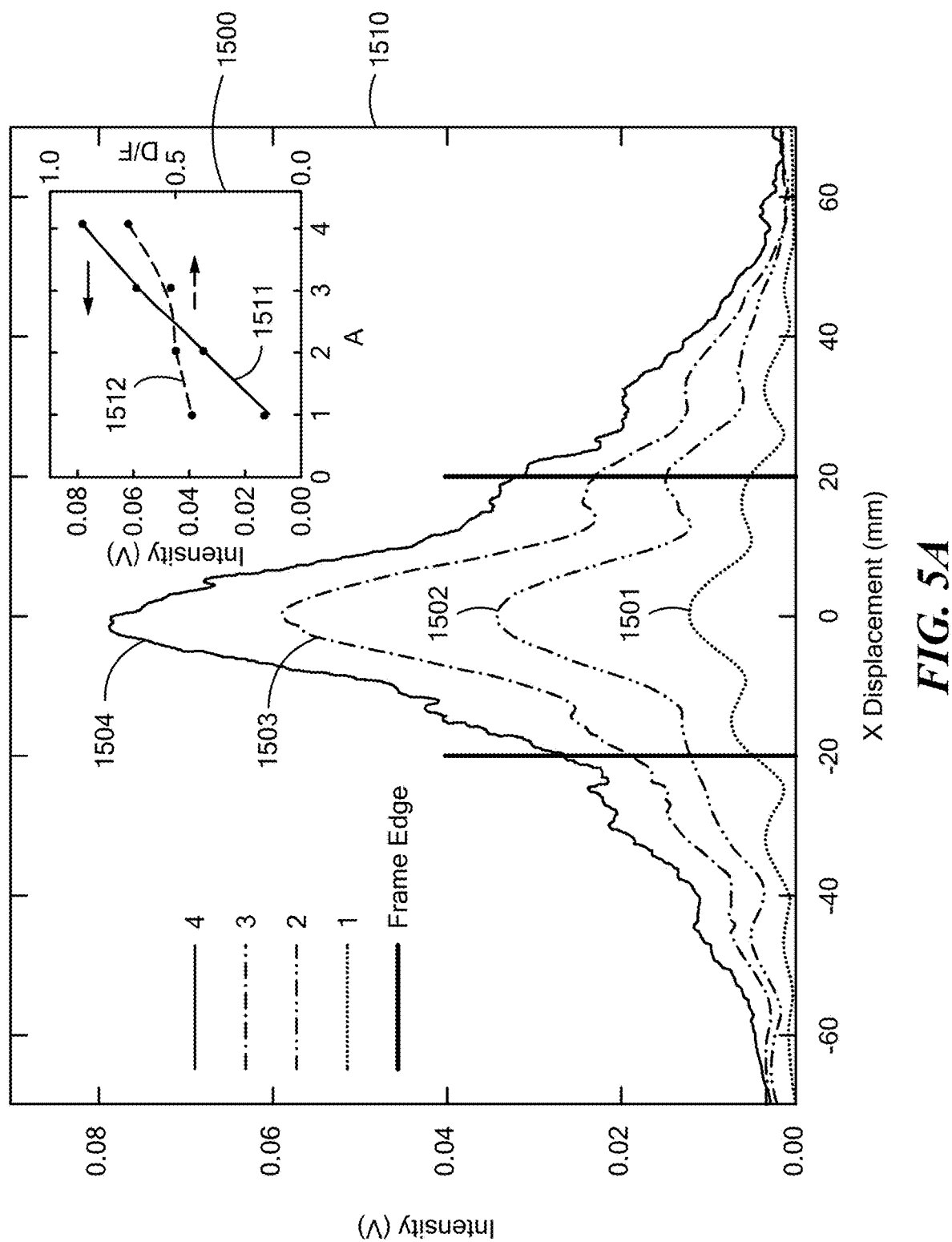
FIG. 5A shows further illustrative signal waveforms of acoustic energy that may be emitted by example transducers according to the disclosure.

Referring to FIG. 5A, a plot 1500 shows example beam profiles of acoustic energy emitted by example transducers according to the first embodiment with a varying numbers of active or powered stages. The acoustic energy is measured at a distance d of about 150 mm from respective outputs of the transducers. Subplot 1510 shows dependence of acoustic intensity of the emitted acoustic energy at X, Y=0 from a center point of the transducer outputs and diameter D normalized by size of frame opening F at the distance d.

In some embodiments, dependences of beam diameter of acoustic energy measured at a distance d of greater than or equal to about 200 mm from the transducer output can be fitted with a straight line and used for the estimation of a beam divergence angle θ. The beam divergence angle θ may be given by θ=2×arctan(ΔD/Δd/2), where ΔD is the change of beam diameter corresponding to the change of a distance Δd from which the acoustic energy is measured from the transducer output. For the 4-stage transducer depicted by curve 1504, the beam divergence angle θ was found to be about 5.9° and about 4.8° for X-I and Y-I scans, respectively. It was observed that the divergence angle generally depends on number N of active stages or frames in the transducer, with the divergence angle being the smallest (~2.9°) for the 3-stage transducer configuration, as illustrated by curves 1501, 1502, 1503, 1504 in plot 500 and curves 1511 and 1512 in subplot 1500. The narrowest beam point for the acoustic energy emitted by the 1-stage transducer, as depicted by curve 1501 in plot 1500, is equal to about 43% of the frame size.

As illustrated in plot 1500 and subplot 1510, the beam profile of the emitted acoustic energy (i.e., a second acoustic energy) may be adjusted by adjusting the number N of active stages in the transducer. The ability to adjust the beam profile (e.g., diameter) of emitted acoustic energy is important for many applications, including ultrasonic echography applications which can benefit from dynamic beam shaping. The beam profile of the emitted acoustic energy may also change in response to changes in the distance d from which the acoustic energy is measured or observed from a transducer output, as further shown in FIGS. 5B and 5C.

Figure 5B:
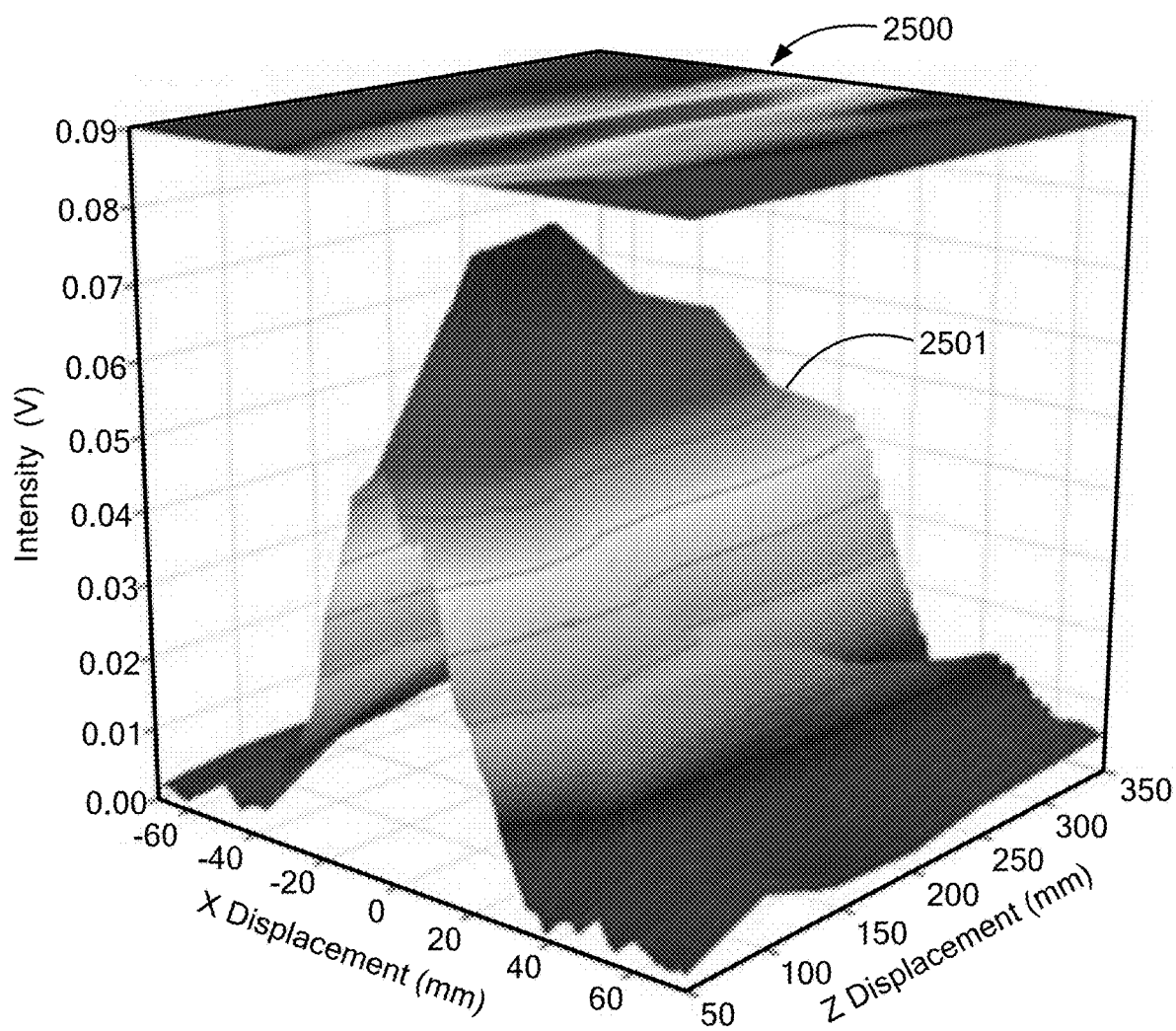
FIG. 5B is a plot illustrating an example beam profile of emitted acoustic energy as observed from an output of an example transducer.

Changes in the beam profile of the emitted acoustic energy with the distance d can be illustrated with a 3D plot assembled from several X-I scans and a corresponding contour plot, such as 3D plot 2500 and the corresponding contour plot above the 3D plot shown in FIG. 5B. Both are typical for the ultrasonic emission in the Fresnel region.

As shown, the beam profile of the emitted acoustic energy (here, a beam profile 2501) shown in 3D plot 2500 has a shape related to the acoustic intensity of the emitted acoustic energy and a distance d (here, an X displacement and a Z displacement) from which the acoustic energy is measured from transducer output in accordance with coordinate axes 302 shown in FIG. 3, for example. In general, the closer the emitted acoustic energy is measured from the transducer output, the greater the acoustic intensity of the emitted acoustic energy. In other words, the acoustic intensity and the distance from which the acoustic energy is measured generally go hand-in-hand.

Figure 5C:
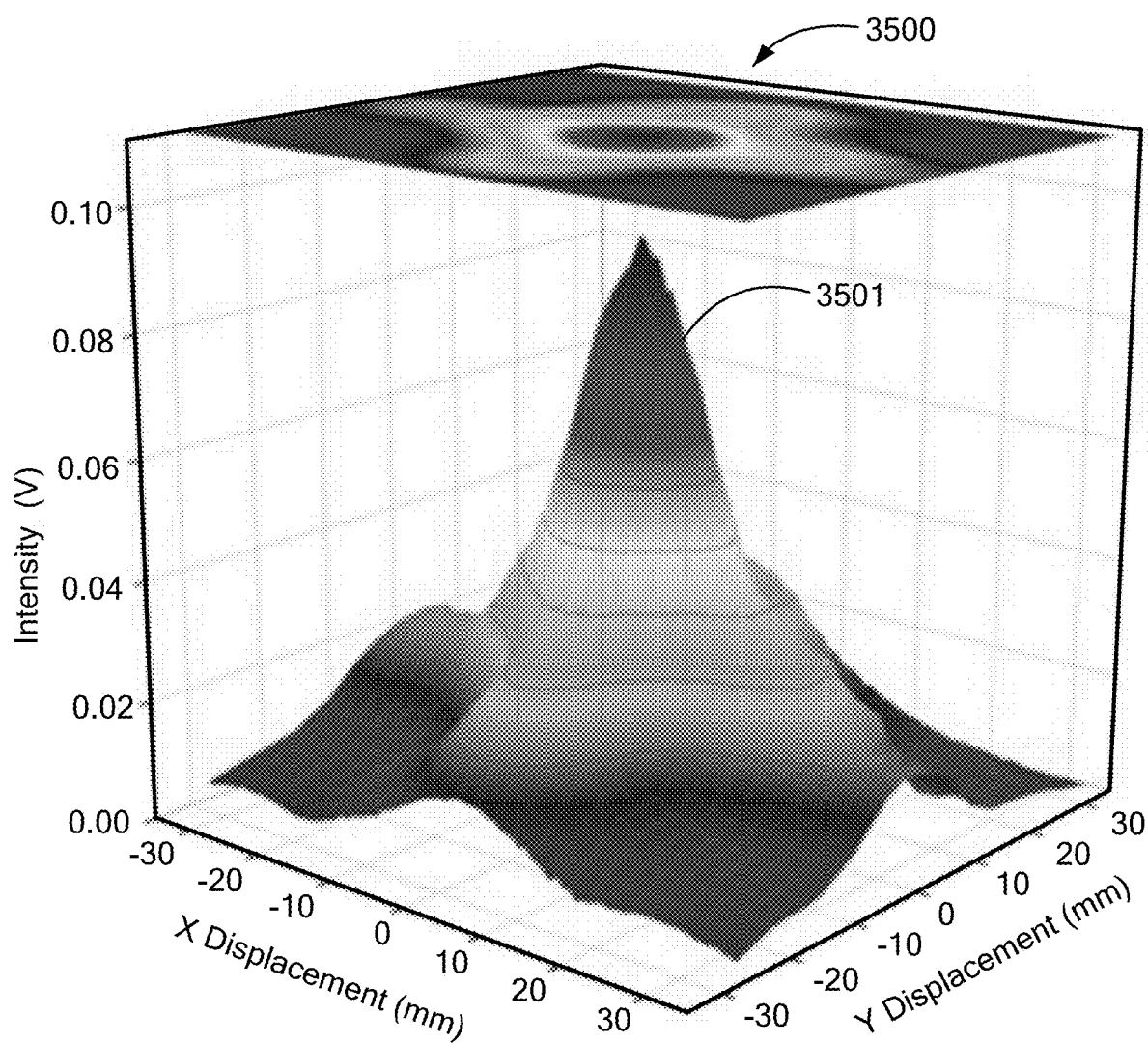
FIG. 5C is a plot illustrating another example beam profile of emitted acoustic energy as observed from an output of an example transducer.

Referring also to FIG. 5C, a 3D plot 3500 assembled from X-I and Y-I scans and a corresponding contour plot illustrate another example beam profile 3501 of ultrasonic acoustic energy emitted by a transducer according to the first embodiment of the disclosure as observed in an XY plane. The acoustic energy is measured at a distance d of about 150 mm from an output of the transducer.

As illustrated, at small or reduced acoustic intensity levels, the beam profile 3501 has cross-like shape. However, at higher acoustic intensity levels the beam profile 3501 has a substantially circular cross-section (which is ideal in some embodiments). From this it can be determined that transducers according to the first embodiment of the disclosure are capable of emitting a substantially narrow, "well-shaped" beam with an approximately circular cross-section and bell-like intensity distribution. Such narrow beam of acoustic energy may be suitable for ultrasonic imaging applications and many other applications. In some embodiments, the beam may be further narrowed by increasing the number N of emission stages in the transducer. As is known, beam narrowing is difficult to achieve in conventional piezoelectric transducers.

Figure 6:
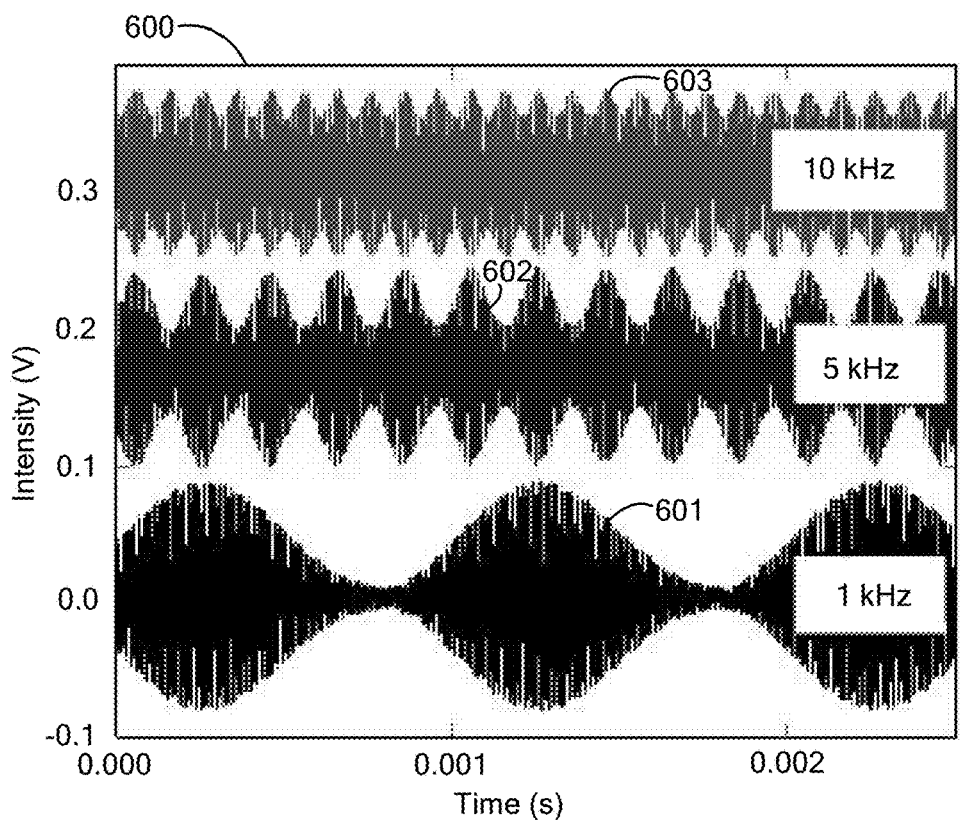
FIG. 6 is a plot illustrating time traces of acoustic energy emitted by an example transducer when the transducer is driven at various modulation frequencies.

Referring to FIG. 6, a plot 600 illustrating time traces of acoustic energy emitted by an example 4-stage transducer according to the first embodiment of the disclosure (e.g., 3300, shown in FIG. 3C) is shown. The acoustic energy represented by curves 601, 602, 603 in plot 600 is emitted at a transducer output in response to the TA frames in the transducer receiving an excitation voltage having an associated modulation frequency as may be generated by a signal generator. Additionally, the acoustic energy represented by curves 610, 602, 603 is measured from a distance d of about 150 mm from the transducer output. An emission peak of the emitted acoustic energy has a frequency (e.g., a carrier frequency) of about 113.5 kHz.

In plot 600, the modulation frequency of the excitation voltage received by the transducer varies from about 1 kHz to about 10 kHz, as shown by curves 601, 602, 603, while the amplitude and modulation depth of the excitation voltage are substantially constant. The modulation depth is equal to about one hundred percent. Additionally, the acoustic energy emitted by the transducer is modulated in time in response to the modulation frequency of received the excitation voltage, with the acoustic energy having an acoustic intensity related to the modulation frequency of the excitation voltage, as shown by curves 601, 602, 603.

It is understood that the acoustic energy emitted by the transducer can also be modulated in time using modulation schemes other than frequency modulation. Examples modulation schemes include amplitude, phase and pulse modulation.

Figure 6A:
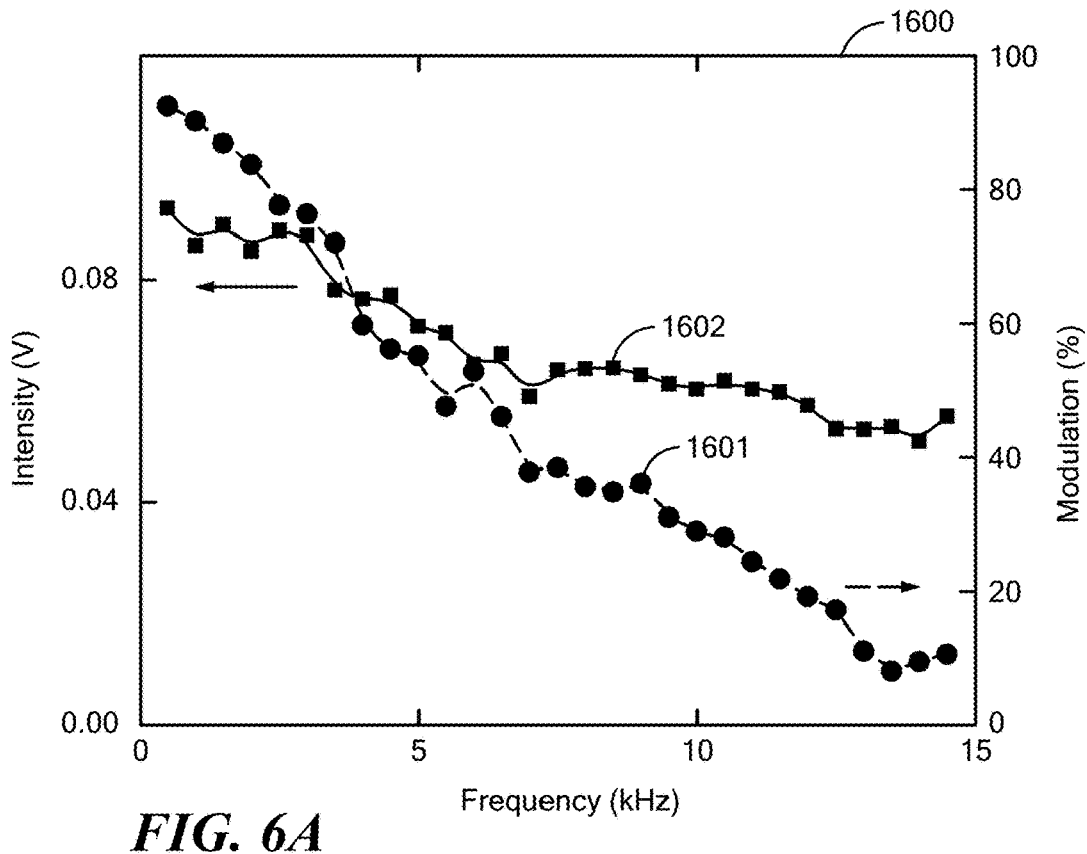
FIG. 6A is a plot illustrating an example relationship between modulation frequency and modulation depth of an excitation voltage received by a transducer.

Referring to FIG. 6A, a plot 1600 illustrating an example relationship between modulation frequency of an excitation voltage as may be received by TA frames in a transducer, modulation depth of the excitation voltage, and an amplitude of acoustic energy emitted by the transducer is shown. As illustrated, an increase in the modulation frequency (e.g., from about 0.5 kHz to about 14 kHz) generally results in a decrease in modulation depth (e.g., from about 92% to about 9.5%), as shown by curve 1601 in plot 1600. Additionally, the amplitude of the emitted acoustic energy generally decreases (e.g., by about 45%) in response to an increase in the modulation frequency (e.g., from about 0.5 kHz to about 14 kHz), as shown by curve 1602 in plot 1600. Such illustrates that the modulation bandwidth of the transducer (e.g., between about 10 kHz and about 15 kHz) is suitable for ultrasonic communications applications. A bandwidth of about 10 kHz, for example, is generally good enough for acoustic communications.

As illustrated in FIGS. 2-6A above, transducers according to the first embodiment of the disclosure are capable of emitting a substantially intense, highly directional beam of acoustic energy in the ultrasonic frequency range. As such, these transducers are consistent with requirements for sound amplification by stimulated emission of radiation (SASER).

As also illustrated in FIGS. 2-6A above, transducers according to the first embodiment of the disclosure are scalable (i.e., TA frames may be added to or subtracted from the transducers), flexible (e.g., dimensions of one or more components may be adjusted based on the application) and one or more characteristics (e.g., a frequency and/or acoustic intensity) of the acoustic energy emitted by the transducers can be adjusted in substantially real time to comply with diverse practical needs. It is understood that such features are not available from conventional piezoelectric transmitters.

According to another embodiment of the disclosure, performance of the transducers described above in connection with FIGS. 2-6A can be further improved by incorporating additional acoustic couplers into the transducer, as shown in FIG. 7, for example.

Referring to FIG. 7, in which like elements of FIG. 2 are provided having like reference designations, a block diagram of an example transducer 700 according to a second embodiment of the disclosure is shown. The transducer 700 includes a plurality of TA frames (here, three TA frames 210, 1210, 2210), an acoustic reflector 220, and a plurality of acoustic couplers (here, three acoustic couplers 230, 730, 732). Acoustic couplers 730, 732 may be the same as or similar to acoustic coupler 230. Each pair of TA frames and acoustic couplers (e.g., thermally conductive couplers) corresponds to a so-called "stage" of the transducer 700 according to the second embodiment of the disclosure. It follows that the transducer 700 is a 3-stage transducer.

Similar to transducer 200 of FIG. 2, the TA frames 210, 1210, 2210 of transducer 700 each include a TA sheet (e.g., 212) and a frame (e.g., 211) over which the TA sheet is disposed. Additionally, similar to transducer 200 of FIG. 2, the TA frames 210, 1210, 2210 are spaced apart from each other by predetermined distances (here, first predetermined distances d1, d2). Further, similar to transducer 200 of FIG. 2, the TA frames 210, 1210, 2210 are stacked or arranged substantially parallel with respect to each other such that first and second surfaces of TA frame 210 are substantially parallel with respect to the first and second surfaces of TA frames 1210, 2210. Here, however, unlike transducer 200 of FIG. 2, a first one of the TA frames (here, TA frame 210) and is disposed between an acoustic reflector and an acoustic coupler (here, acoustic reflector 220 and acoustic coupler 730), and remaining ones of the TA frames (here, TA frames 1210, 2210) are disposed between two acoustic couplers to provide a distributed resonator.

The acoustic couplers 230, 730, 732 are spaced apart from each other by second predetermined distances (here, second predetermined distances d3, d4). In some embodiments, the first predetermined distances and the second predetermined distances (i.e., separation distances) are substantially the same. Additionally, in some embodiments, the second predetermined distances are substantially equal to nλ such that emission at wavelength λ is resonantly enhanced. In one embodiment, the first predetermined distances and/or the second predetermined distances are selected such that transducer 700 generates an acoustic signal or energy having a predetermined frequency, as will be discussed further.

Each of the TA frames 210, 1210, 2210 is configured to emit or otherwise generate a first acoustic energy or signal corresponding to a broadband acoustic signal in response to receiving electrical energy from an energy source. Additionally, the resonator comprising TA frames 210, 1210, 2210, acoustic couplers 230, 730, 732, and acoustic reflector 220 is configured to emit or otherwise generate a second acoustic energy or signal corresponding to a narrowband signal at the transducer output (as indicated by arrow 201) in response to the acoustic couplers 230, 730, 732 and the acoustic reflector 220 receiving the first acoustic energy.

In embodiments, a frequency of the second acoustic energy corresponds to the first predetermined distances between the TA frames 210, 1210, 2210. Additionally, in embodiments, the frequency and the predetermined distances are adjustable. Further, in embodiments, one or more additional TA frames may be added to the transducer 700 to alter one or more characteristics (e.g., frequency and/or intensity) associated with the second acoustic energy.

In one embodiment, the second acoustic energy has a frequency between about one kilohertz (kHz) and about ninety-nine kHz. Additionally, in one embodiment, the second acoustic energy frequency is between about one-hundred kHz and about two-hundred kHz. Further, in one embodiment, the second acoustic energy frequency is greater than about two-hundred kHz. In one example configuration of transducer 700, the first predetermined distances between TA frames 210, 1210, 2210 and the second predetermined distances between acoustic couplers 230, 730, 732 are selected to be about 3.1 mm such that the second acoustic energy frequency is about 110 kHz.

Emission or acoustic intensity of the second acoustic energy may be controlled by adjusting the second predetermined distances between each of the acoustic couplers 230, 730, 732. Additionally, emission intensity of the second acoustic energy may be controlled by adjusting the first predetermined distances between the TA frames 210, 1210, 2210 and/or a predetermined distance d5 between acoustic reflector 220 and acoustic coupler 230. In one embodiment, the second acoustic energy has an emission intensity of at least one pascal per watt (Pa/W) at a distance of about one hundred fifty mm from an output of the transducer 700. Additionally, in one embodiment, a divergence angle of the second acoustic energy is less than about sixty degrees at a distance of about one hundred fifty mm from the transducer output.

Further aspects of transducers according to the second embodiment will be described in connection with figures below.

Figure 7A:
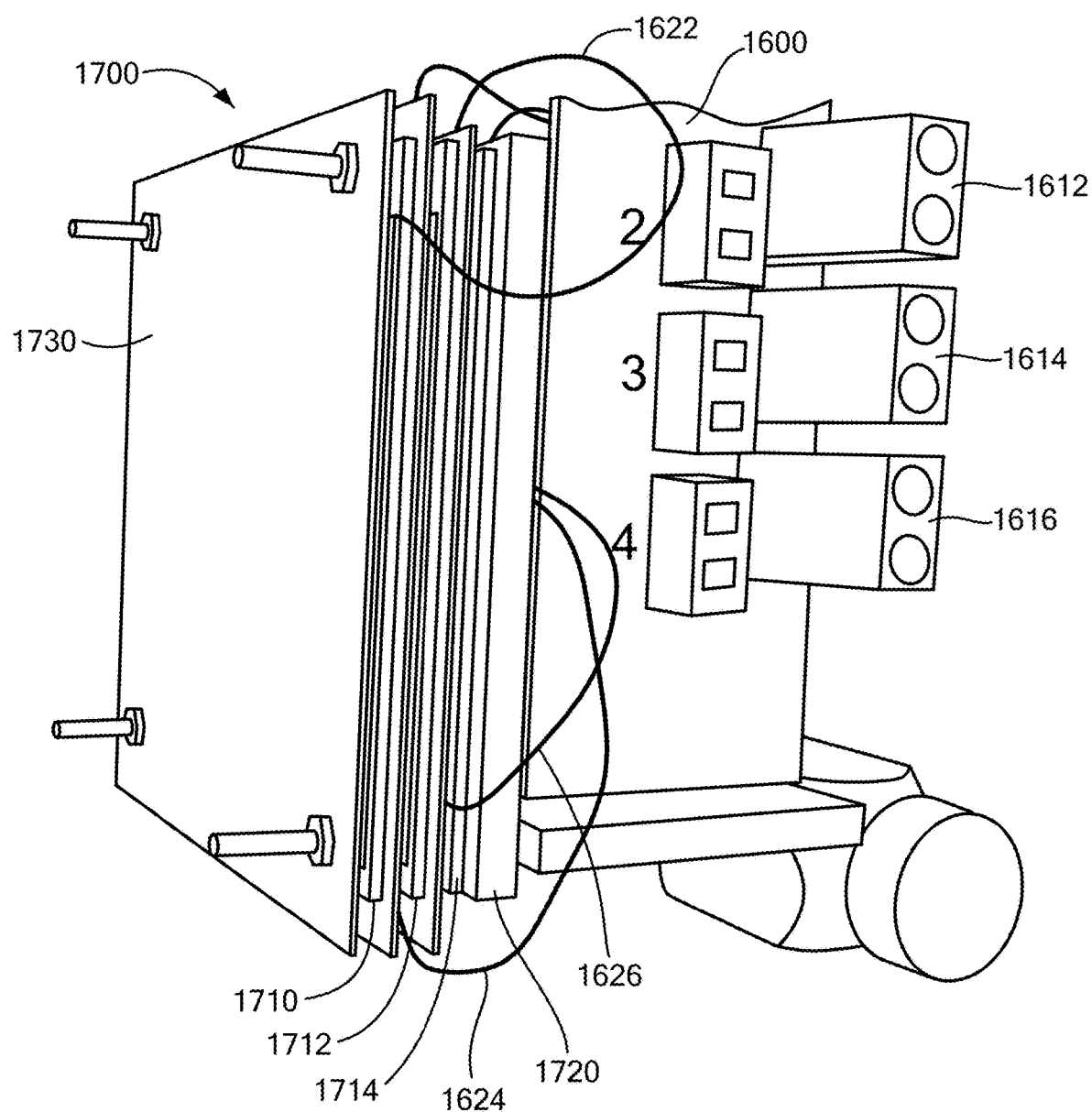
FIG. 7A is a pictorial representation of an example transducer coupled to a mounting surface.

Referring to FIG. 7A, an example 3-stage transducer 1700 according to the second embodiment is shown coupled to an example mounting surface, structure or holder 1600 which may be the same as or similar to the mounting surface or structure 3100 shown in FIG. 2C. An acoustic reflector 1720 of the transducer 1700 is disposed and coupled proximate to the mounting surface 3100 and an acoustic coupler 1730 of the transducer 1700 is distal from the mounting surface 3100. TA frames 1712, 1714, 1716 comprising TA sheets and associated frames are disposed between the acoustic reflector 1720 and the acoustic coupler 1730. Additionally electrical leads of the TA frames 1712, 1714, 1716 are coupled to corresponding connectors (e.g., 1612, 1614, 1616) on the mounting surface 1600 via wires (e.g., 1622, 1624, 1626). The connectors may be coupled to a current and/or a voltage source (not shown) and configured to receive electrical energy from the current and/or a voltage source.

In some embodiments, the transducer 1700 and other components associated with the transducer (e.g., mounting surface 1600) may be provided in an enclosure (not shown). Similar to the enclosure described above in connection with FIG. 2C, the enclosure may be an enclosure associated with a device (e.g., a communications device) in which the transducer is provided.

Figure 8:
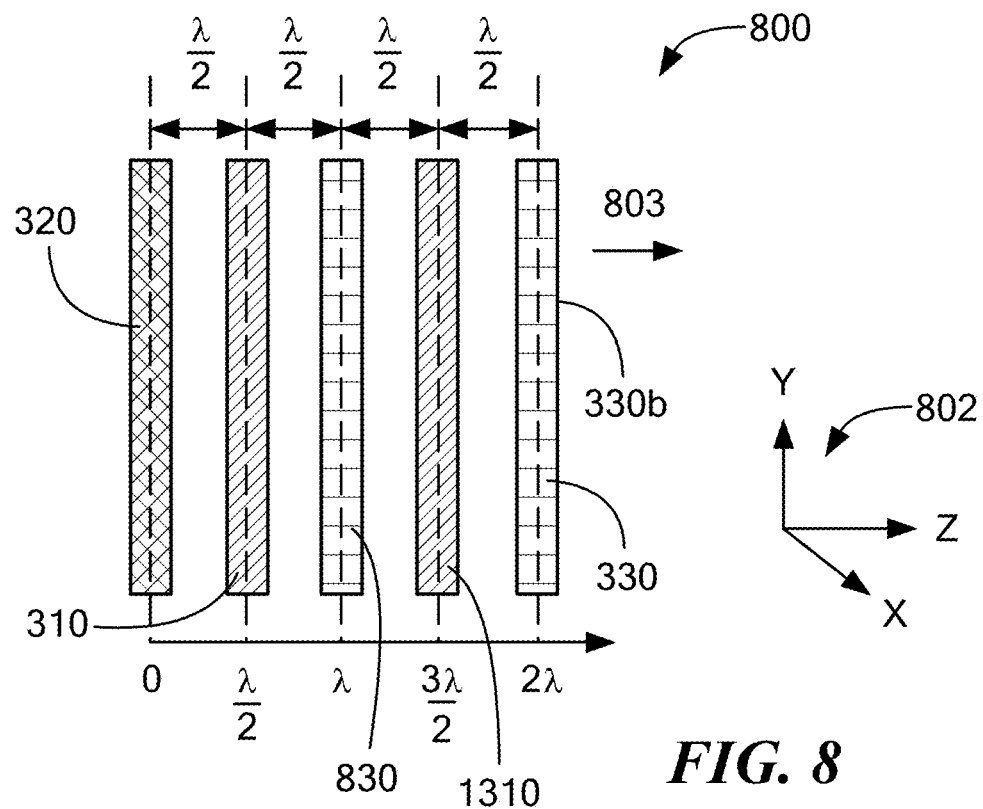
FIG. 8 is a side view of a first example configuration of a transducer according to second embodiment of the disclosure.
Figure 8A:
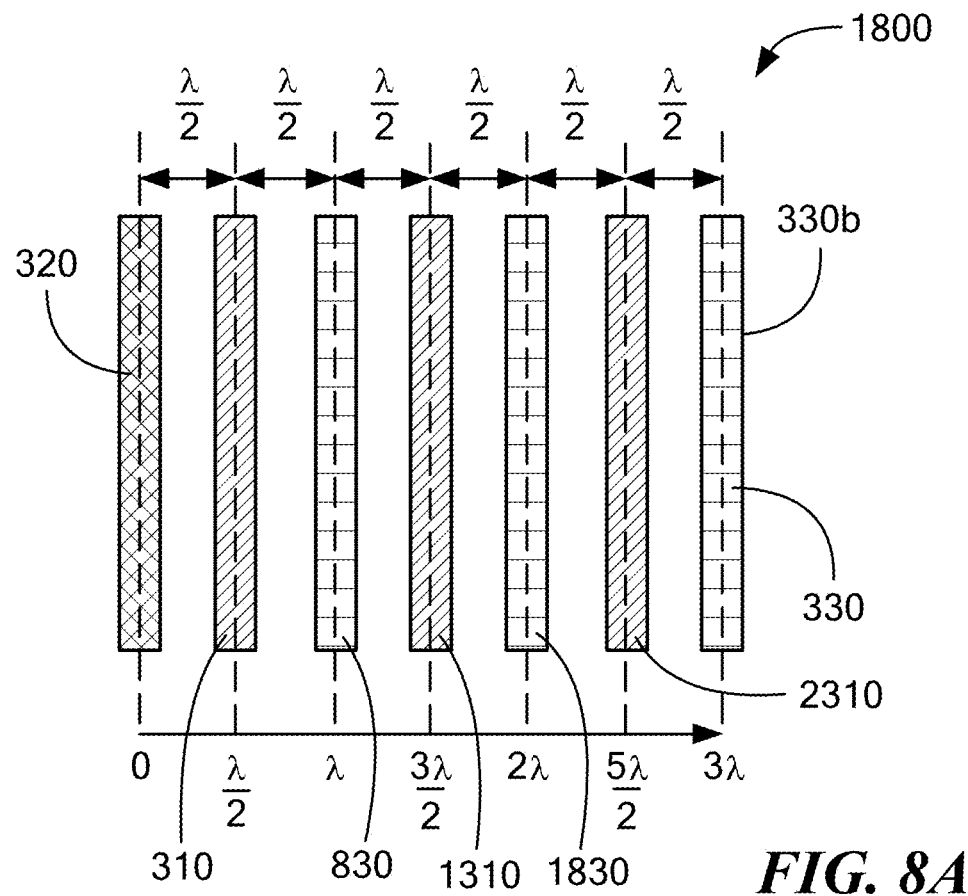
FIG. 8A is a side view of a second example configuration of a transducer according to the second embodiment of the disclosure.
Figure 8B:
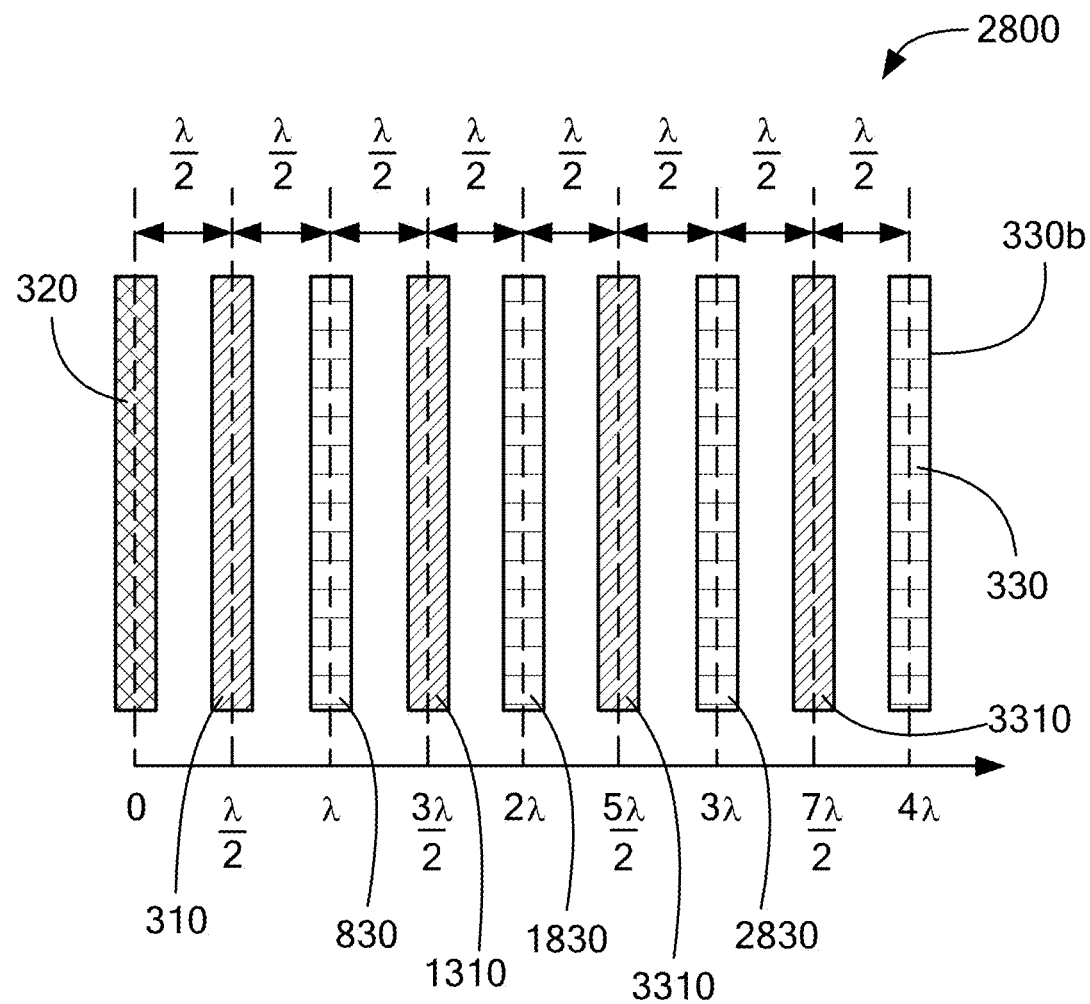
FIG. 8B is a side view of a third example configuration of a transducer according to the second embodiment of the disclosure.

Referring to FIGS. 8-8B, in which like elements of FIGS. 3-3D are provided having like reference designations, several further example configurations of transducers (e.g., 800, shown in FIG. 8) according to the second embodiment of the disclosure are shown.

Referring to FIG. 8, an example transducer 800 (e.g., a 2-stage transducer) includes a plurality of TA frames (here, two frames 310, 1310), acoustic reflector 320 and a plurality of acoustic couplers (here, two couplers 330, 830). The TA frame 310 is disposed between acoustic reflector 320 and acoustic coupler 830, which may be the same as or similar to acoustic coupler 330. Additionally, TA frame 1310 is disposed between acoustic couplers 830, 330. The TA frames 310, 1310 are each configured to emit a first acoustic energy (e.g., in positive and negative z directions in accordance with coordinate axes 802) in response to receiving electrical energy. Additionally, a distributed resonator formed from the TA frames 310, 1310, acoustic reflector 320 and acoustic couplers 330, 830 is configured to emit a second acoustic energy (as indicated by arrow 803) at a transducer output (here, surface 330b of acoustic coupler 330) in response to the acoustic reflector 320 and the acoustic couplers 330, 830 receiving the first acoustic energy.

In the illustrated embodiment, TA frame 310 is spaced apart from TA frame 1310 by a predetermined distance equal to $n\lambda$, where $\lambda$ is a wavelength of the acoustic energy emitted at the transducer output (i.e., the second acoustic energy) and n is an integer number. Acoustic coupler 830 is also spaced apart from acoustic coupler 330 by a distance $\lambda$. Additionally, a distance $2\lambda$ exists between acoustic reflector 320 and acoustic coupler 330, with TA frame 310 spaced apart from acoustic reflector 320 by a distance $\lambda/2$ and TA frame 1310 spaced apart from acoustic coupler 330 by a distance $\lambda/2$.

A frequency of the acoustic energy emitted at the transducer output is related to $\lambda$ and the speed of sound c in a given transmission medium by the equation $f=c/\lambda$. It follows that the frequency of the emitted acoustic energy may be adjusted by adjusting $\lambda$ and the distance between TA frames 310, 1310. For example, the frequency may be adjusted from a first frequency of about 110.6 kHz to a second frequency of about 55.3 kHz by adjusting $\lambda$ and the distance between TA frames 310, 1310 from about 3.1 mm to about 6.2 mm (e.g., by moving or tilting the TA frames in accordance with coordinate axes 802). Additionally, in some embodiments, a frequency of the emitted acoustic energy may further be adjusted by adjusting $\lambda$ and a distance between the acoustic couplers 330, 830.

In one aspect of the disclosure, performance of transducer 800 (e.g., emission intensity of the acoustic energy emitted at the transducer output) may be improved by increasing a number of stages in the transducer 800 from two stages to three or more stages, as shown in the transducers of FIGS. 8A and 8B, for example.

Referring to FIG. 8A, another example transducer 1800 (e.g., a 3-stage transducer) includes TA frames 310, 1310, 2310, acoustic reflector 320 and three acoustic couplers 330, 830, 1830. TA frame 310 is disposed between acoustic reflector 320 and acoustic coupler 330 and TA frames 1310 and 2310 are each disposed between two acoustic couplers, with TA frame 1310 disposed between acoustic couplers 830, 1830 and TA frame 2310 disposed between acoustic couplers 1830, 330.

TA frames 310, 1310 and 2310 are spaced apart from each other by a distance $\lambda$, and acoustic couplers 830, 1830 and 330 are also spaced apart from each other by a distance $\lambda$. Additionally, a distance $3\lambda$ exists between acoustic reflector 320 and acoustic coupler 330, with TA frame 310 spaced apart from acoustic reflector 320 by a distance $\lambda/2$ and TA frame 2310 spaced apart from acoustic coupler 330 by a distance $\lambda/2$. A frequency of the acoustic energy emitted at the transducer output (i.e., the second acoustic energy) may be adjusted by adjusting λ and a distance between two or more of the TA frames 310, 1310, 2310.

In one embodiment, a beam profile of the acoustic energy emitted at the transducer output is based, at least in part, upon a number of TA frames (e.g., 310, 1310, 2310) and/or acoustic couplers (e.g., 830, 1830, 330) in a transducer (e.g., 1800) according to the second embodiment. It follows that the acoustic energy emitted by transducer 1800 of FIG. 8A may have a different beam profile than the acoustic energy emitted by transducer 800 of FIG. 8.

Referring to FIG. 8B, further example transducer 2800 (e.g., a 4-stage transducer) includes TA frames 310, 1310, 2310, 3310, acoustic reflector 320 and acoustic couplers 330, 830, 1830, 2830. TA frame 310 is disposed between acoustic reflector 320 and acoustic coupler 330 and TA frames 1310, 2310, and 3310 are each disposed between two acoustic couplers, with TA frame 1310 disposed between acoustic couplers 830, 1830, TA frame 2310 disposed between acoustic couplers 1830, 2830, and TA frame 3310 disposed between acoustic couplers 2830, 330.

TA frames 310, 1310, 2310, 3310 are spaced apart from each other by a distance λ, and acoustic couplers 330, 830, 1830, 2830 are also spaced apart from each other by a distance λ. Additionally, a distance 4λ exists between acoustic reflector 320 and acoustic coupler 330, with TA frame 310 spaced apart from acoustic reflector 320 by a distance λ/2 and TA frame 3310 spaced apart from acoustic coupler 330 by a distance λ/2. A frequency of the acoustic energy emitted at the transducer output may be adjusted by adjusting λ and a distance between two or more of TA frames 310, 1310, 2310, 3310. Additionally, in some embodiments, a frequency of the acoustic energy emitted at the transducer output may be adjusted by adjusting λ and a distance between two or more of acoustic couplers 330, 830, 1830, 2830.

While transducers including two, three and four stages are shown in FIGS. 8-8B, respectively, it should be appreciated that transducers according to the second embodiment may include more than four stages in some embodiments. Additionally, it should be appreciated that the transducers shows in FIGS. 8-8B are but three of many potential configurations of transducers in accordance with the second embodiment. As one example, at least one of the TA frames 310, 1310, 2310, 3310 of transducer 2800 may have a different shape than that which is shown.

Figure 9:
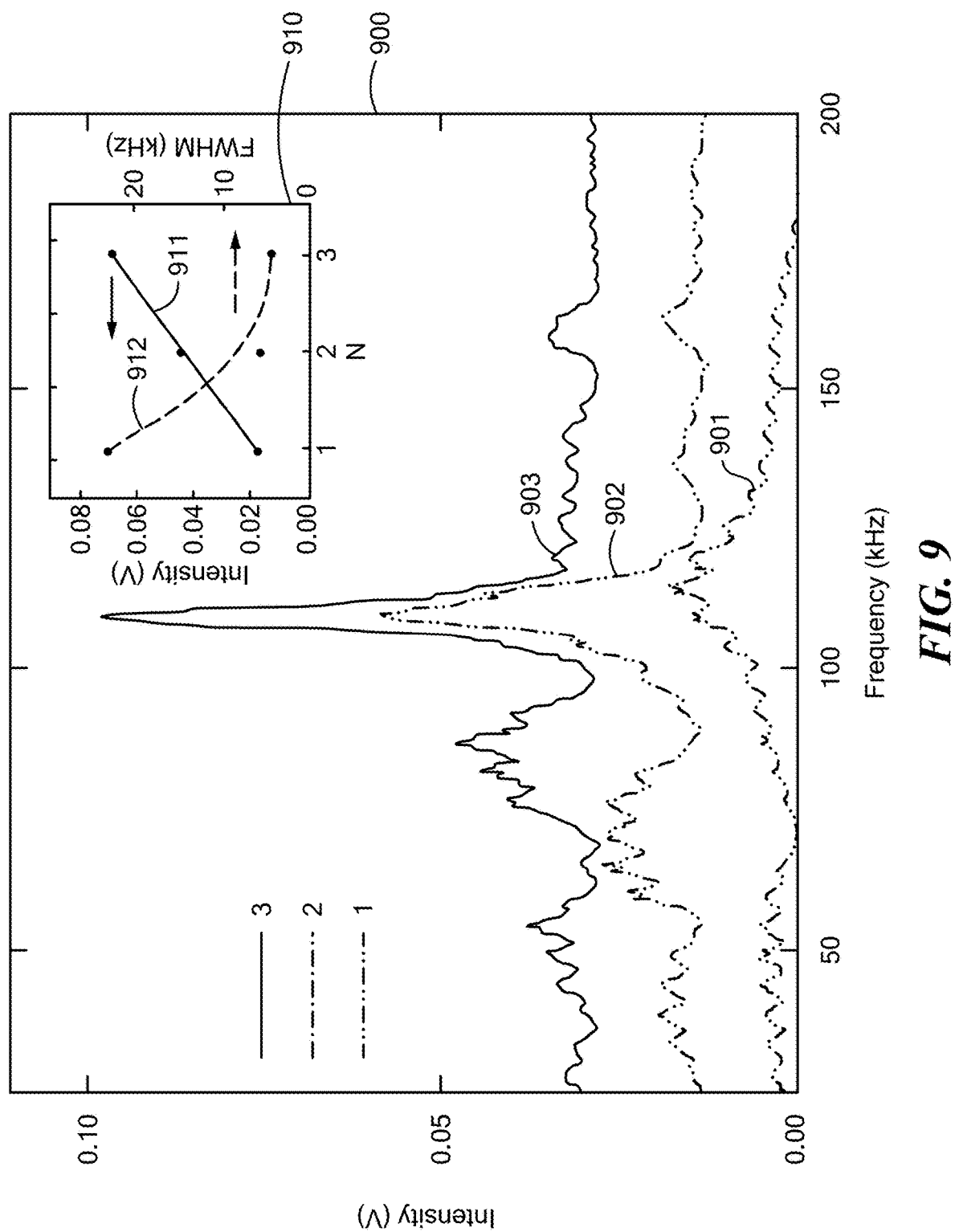
FIG. 9 shows illustrative signal waveforms of acoustic energy that may be emitted by example thermoacoustic transducers according to the disclosure.
Figure 10:
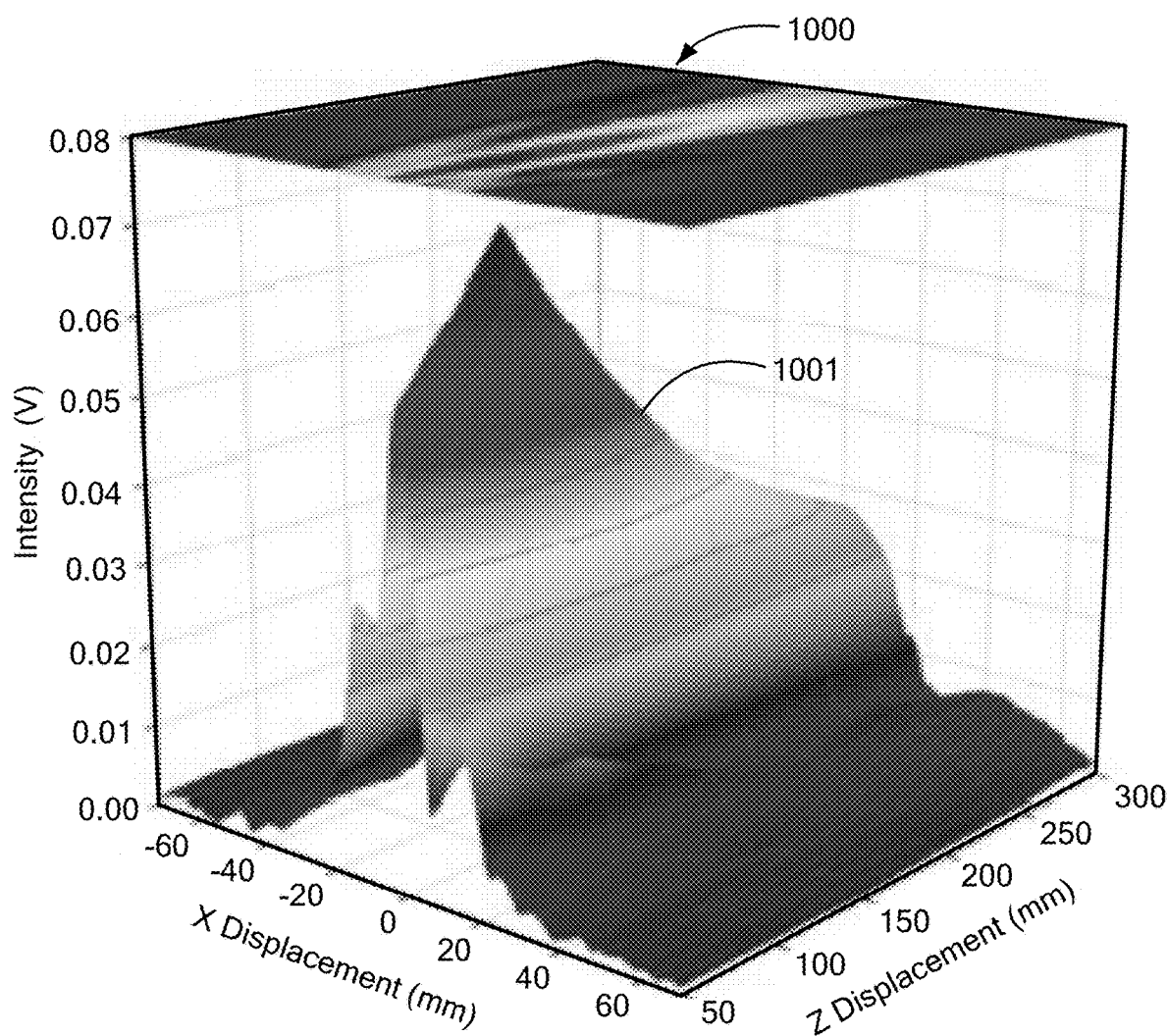
FIG. 10 is a plot illustrating an example beam profile of emitted acoustic energy as observed from an output of an example transducer.
Figure 11:
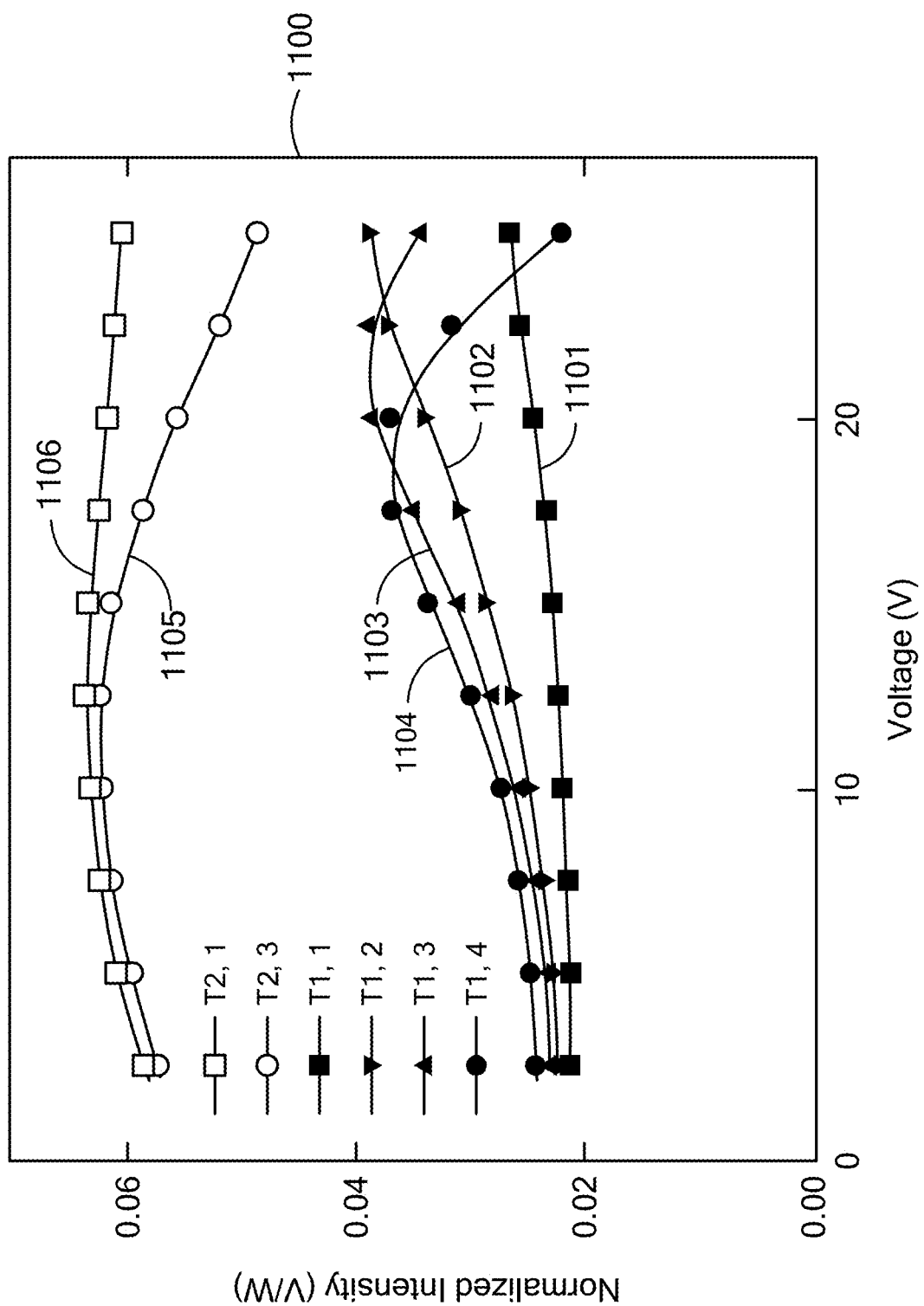
FIG. 11 is a plot illustrating acoustic intensities of acoustic energy emitted by example transducers according to first and second embodiments of the disclosure in response to the transducers receiving various excitation voltages.

Plots illustrating performance characteristics of example transducers according to the second embodiment of the disclosure are shown in FIGS. 9-11.

Referring to FIG. 9, a plot 900 illustrating frequency dependencies of acoustic energy emitted (i.e., ultrasonic emission) by example transducers according to the second embodiment of the disclosure versus acoustic intensity of the emitted acoustic energy is shown. The acoustic energy is emitted at an output of the transducers. Additionally, a subplot 910 in FIG. 9 shows dependence of full width at half maximum (FWHM) and acoustic intensity of the emitted acoustic energy and an emission peak of the emitted acoustic energy on a number N of stages (here, 1, 2 or 3) in the transducers. The transducers may be the same as or similar to the 1, 2 and 3-stage transducers shown in FIGS. 8-8B, respectively. In the embodiments shown in FIGS. 8-8B (as well as FIGS. 7 and 7A), each transducer stage includes a TA frame (e.g., 310, shown in FIG. 8) and an acoustic coupler (e.g., 830, shown in FIG. 8). The TA frame and the acoustic coupler are combined with an acoustic reflector (e.g., 320, shown in FIG. 8) to obtain a distributed resonator.

As illustrated in plot 900, the acoustic energy emitted by the 3-stage transducer, as depicted by curve 902, has an emission peak with a maximum frequency (i.e., an emission frequency) near about 110.2 kHz and a FWHM of about 4.4 kHz. This is in contrast to the 4-stage transducer according to the first embodiment which has an emission peak with a maximum frequency near about 113.5 kHz and a FWHM of about 6.4 kHz, as depicted by curve 405 in plot 400 of FIG. 4. While the emission peak of the 3-stage transducer according to the second embodiment is substantially similar to the emission peak of the 4-stage transducer according to the first embodiment, the FWHM of the 3-stage transducer is about 31% less than the FWHM of the 4-stage transducer. In embodiments, the FWHM of transducers according to the second embodiment substantially decreases in response to increasing the number of stages in the transducer, for example, to match diverse practical requirements.

Referring in closer detail to FIG. 9, curves 901, 902, 903 in plot 900 and curve 911 in subplot 910 show that the acoustic intensity of the emitted acoustic energy is substantially proportional to a number N of stages in the transducers (here, with N=1, 2 or 3). Additionally, curve 912 in subplot 910 shows that the FWHM of the emitted acoustic energy is related to the number N of stages in the transducer. In particular, the FWHM of the emitted acoustic energy substantially decreases in response to an increasing number N of stages in the transducer.

In plot 900 and subplot 910 it is also observed that the "quality" of the emitted acoustic energy is related to the number N of stages in the transducers, for example, as illustrated by the FWHM of the emitted acoustic energy. In embodiments, it may be said that the acoustic energy emitted by the 1-stage transducer is of a lower quality than the acoustic energy emitted by each of the 2 and 3 stage transducers. Such may be due to the 2 and 3-stage transducers having a greater number of acoustic couplers than the 1-stage transducer.

Figure 9A:
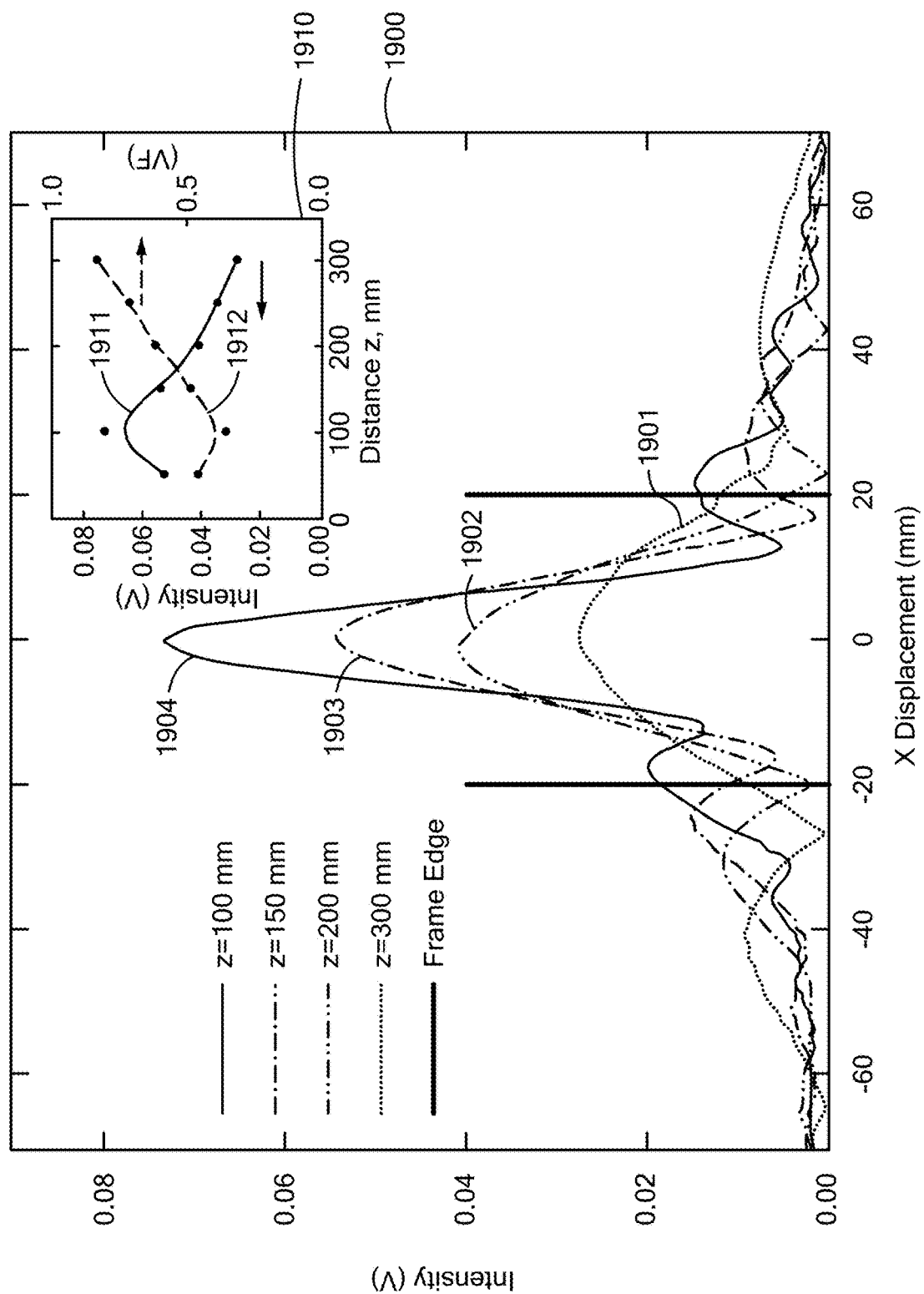
FIG. 9A shows additional illustrative signal waveforms of acoustic energy that may be emitted by an example thermoacoustic transducer according to the disclosure.

Referring to FIG. 9A, a plot 1900 shows frequency dependencies of acoustic energy emitted by an example 3-stage transducer according to the second embodiment of the disclosure (e.g., 1800, shown in FIG. 8A) versus acoustic intensity of the emitted acoustic energy. The acoustic energy is measured at various distances d from an output of the transducer by a sensor (e.g., a microphone) which may be the same as or similar to sensor 120 of FIG. 1. Additionally, a subplot 1910 in FIG. 9A shows dependence of acoustic intensity of the emitted acoustic energy at X, Y=0 from a center point of the transducer output and diameter D normalized by size of frame opening F at the various distances d. As illustrated by curves 1901, 1902, 1903 and 1904 in plot 1900 and by curves 1911 and 1912 in subplot 1910, the acoustic energy emitted by the transducer generally has a narrow beam profile than acoustic energy emitted by similar transducers according to the first embodiment. In one aspect of the disclosure, the foregoing is due to the increased number of acoustic couplers (e.g., thermally conductive acoustic couplers) provided in the transducer according to the second embodiment, which may help to dissipate heat produced during operation of the transducer.

Figure 9B:
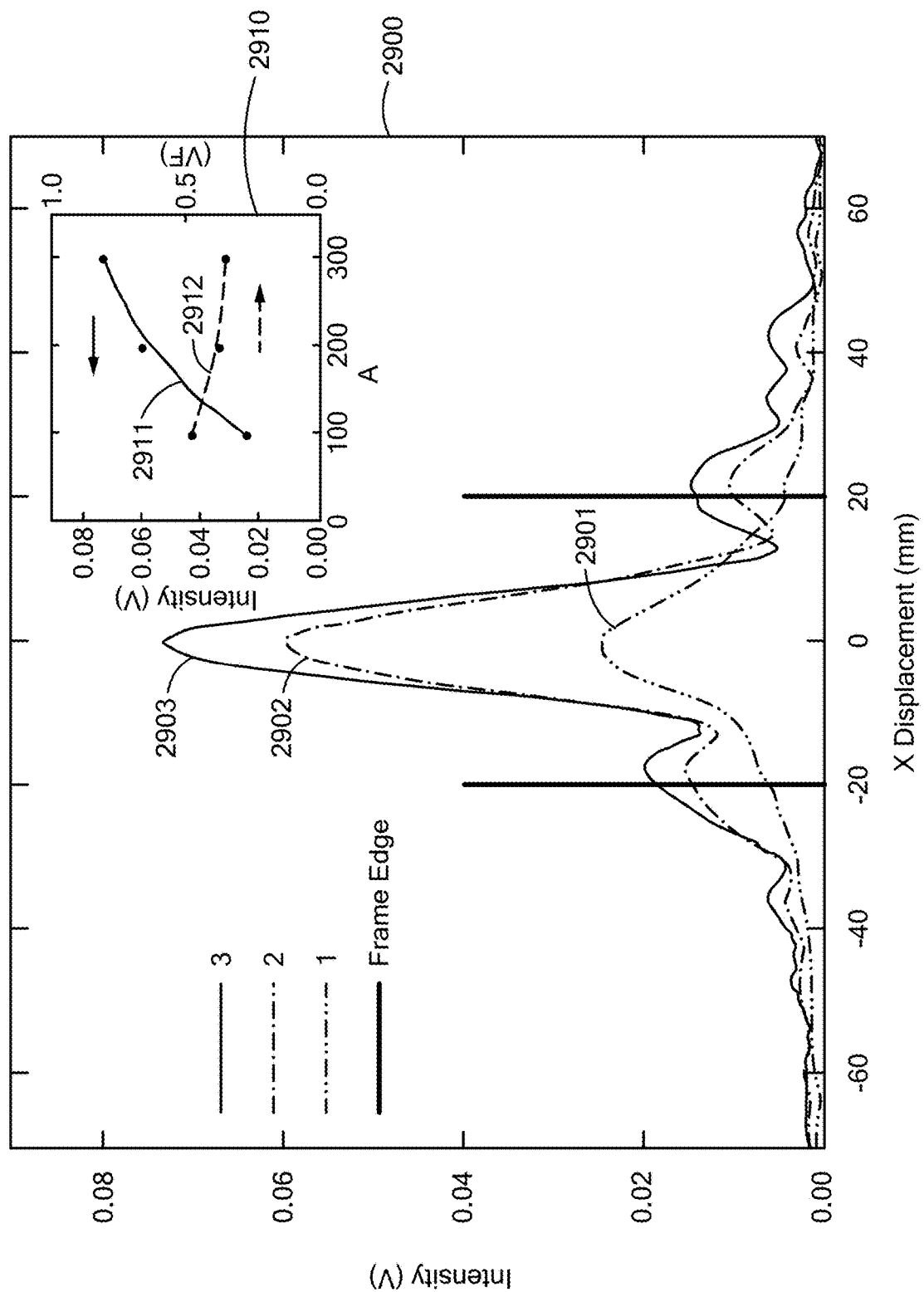
FIG. 9B shows further illustrative signal waveforms of acoustic energy that may be emitted by example thermoacoustic transducers according to the disclosure.

Referring to FIG. 9B, a plot 2900 shows example beam profiles of acoustic energy emitted by example transducers according to the second embodiment with a varying number N of active or powered stages. The acoustic energy is measured at a distance d of about 100 mm from respective outputs of the transducers. Subplot 2910 shows dependence of acoustic intensity of the emitted acoustic energy at X, Y=0 from a center point of the transducer output and diameter D normalized by size of frame opening F at the distance d. As illustrated by curves 2901, 2902 and 2903 in plot 2900 and by curves 2911 and 2912 in subplot 2910, the acoustic energy emitted by the transducers generally has a narrow beam profile than acoustic energy emitted by similar transducers according to the first embodiment. The foregoing may also be due to the increased number of acoustic couplers (e.g., thermally conductive acoustic couplers) provided in the transducer according to the second embodiment, which may help to dissipate heat produced during operation of the transducer.

Figure 10A:
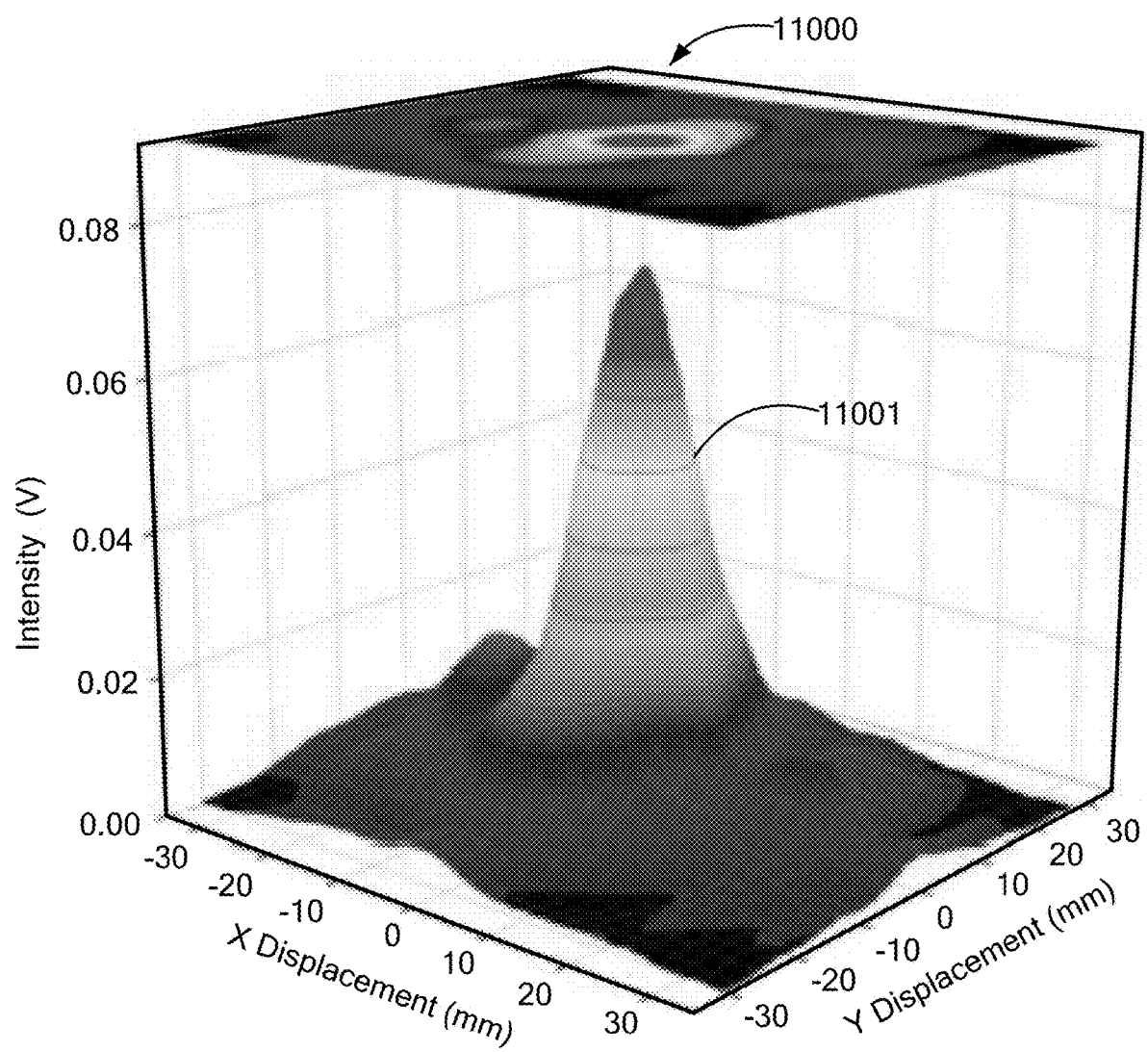
FIG. 10A is a plot illustrating another example beam profile of emitted acoustic energy as observed from an output of an example transducer.

A 3D plot showing a shape or beam profile of the emission peak of the emitted acoustic energy in an XY plane can be assembled from several X-I and Y-I scans that are taken at a predetermined distance (e.g., d=150 mm) from a transducer output, for example, as illustrated by 3D plot 1000 and corresponding contour plot shown in FIG. 10, and 3D plot 11000 and corresponding contour plot shown in FIG. 10A.

As shown in plot 1000, the beam profile of the emitted acoustic energy (here, a beam profile 1001) has a shape related to the acoustic intensity of the emitted acoustic energy and a distance (here, an X plane displacement and a Z plane displacement) from which the acoustic energy is measured from the transducer output in accordance with coordinate axes 802 shown in FIG. 8, for example. Similar to the acoustic energy beam profile 2501 shown in FIG. 5B, the closer the emitted acoustic energy producing beam profile 1001 is measured from the transducer output, the greater the acoustic intensity of the emitted acoustic energy.

Referring to FIG. 10A, the plot 11000 illustrates another example beam profile 11001 of ultrasonic acoustic energy emitted by a transducer according to the second embodiment of the disclosure in an XY plane. The beam profile 11001 is measured at a distance of about 100 mm from an output of the transducer.

Beam profile 11001, similar to beam profile 3501 shown in FIG. 3, comprises a substantially narrow, "well-shaped" beam of acoustic energy. Here, the beam profile 11001 is even narrower than the beam profile 3501 shown in FIG. 3 (e.g., due to the increased number of acoustic couplers provided in transducers according to the second embodiment). In some embodiments, the beam profile 11001 may be further narrowed by increasing the number N of emission stages in the transducer. As discussed above, beam narrowing is difficult to achieve in conventional piezoelectric transducers.

In the Fresnel region, the beam profile 11001 has a substantially bell-like shape with circular cross-section. Beam divergence for the 3-stage transducer was found to be equal to about 5.7° and about 6.5° in the X and Y planes, respectively, and substantially similar to the beam divergence of the 4-stage transducer according to the first embodiment. Additionally, it was found that the divergence angle does not significantly depend on the number of active frames in the transducer.

Plot 11000 as well as corresponding contour plot illustrate that at relatively small (or reduced) intensity levels the beam profile of the emitted acoustic energy has substantially cross-like shape. The plot also illustrates that the beam profile of the emitted acoustic energy has an almost perfect circular cross-section at relatively higher intensity levels. As illustrated, the transducer (e.g., 700, shown in FIG. 7) is capable of emitting a relatively narrow, well-shaped beam that is suitable for ultrasonic imaging applications, for example. In embodiments, an increase of the number of emission stages can further contribute to beam narrowing that is generally difficult to achieve for conventional piezoelectric transducers.

Referring to FIG. 11, a plot 1100 illustrating dependencies of acoustic intensity of ultrasonic emission normalized by received electrical energy (e.g., an AC voltage) for transducers according to first and second embodiments with a varying number N of stages (or active frame configurations) is shown. Curves 1101, 1102, 1103, 1104 correspond to transducers according to the first embodiment with 1, 2, 3 and 4 stages, respectively. Additionally, curves 1105, 1106 correspond to transducers according to the second embodiment with 1 and 3 stages respectively.

As illustrated in plot 1100, the acoustic energy emitted by transducers according to both the first and second embodiments has a normalized intensity which is generally related to a number N of stages in the transducers. As also illustrated, the acoustic energy emitted by transducers according to the second embodiment has a larger normalized intensity than the acoustic energy emitted by transducers according to the first embodiment. In one aspect of the disclosure, the foregoing is due to the increased number of acoustic couplers provided in transducers according to the second embodiment in comparison to transducers according to the first embodiment. As discussed above, the acoustic couplers may be thermally conductive acoustic couplers which may help to dissipate heat produced during operation of a transducer and, in turn, increase performance of the transducer.

As illustrated in figures above, transducers according to the disclosure are capable of emitting acoustic energy having frequencies which are greater than about 100 kHz, making these transducers a viable option for replacing conventional piezoelectric ultrasonic transducers and/or other ultrasonic transducers. The concepts, systems, circuits, and techniques described herein enabled the design and development of a 4-stage ultrasonic transducer with a highest effective (i.e., working) frequency of about 110 kHz. It is believed that the highest effective frequency may be further increased by increasing a number of stages in the transducer.

The 4-stage transducer (and, in some embodiments, transducers with fewer than 4-stages) were demonstrated to emit substantially intense, highly directional acoustic energy in a narrow frequency range and to comply with requirements for thermoacoustic SASER. Explored transducer designs are capable of emitting acoustic energy across a broad frequency range, are scalable for achieving high emission intensities, and can be tuned in real time by changing a number of active TA frames or stages in the transducer. It is understood that similar features are not available from conventional piezoelectric transducers. Explored transducer designs are also capable of emitting acoustic energy that may be modulated in time and have been demonstrated to transmit acoustic energy in air over distances of greater than about 10 meters, making transducers according the disclosure suitable for a wide variety of applications. In particular, transducers according to the disclosure may be useful in substantially any application where acoustic energy may be emitted and/or detected (e.g., to convey information, mask information, identify people and objects, etc.).

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A transducer, comprising:
   an acoustic reflector;
   an acoustic coupler disposed proximate to an output of the transducer; and
   one or more thermoacoustic frames disposed between the acoustic reflector and the acoustic coupler, wherein the thermoacoustic frames, the acoustic reflector and the acoustic coupler form a resonator with each of the thermoacoustic frames configured to emit a broadband acoustic signal in response to receiving electrical energy, and the resonator configured to emit a narrowband acoustic signal at the transducer output in response to receiving the broadband acoustic signal.

2. The transducer according to claim 1, wherein the thermoacoustic frames each comprise one or more thermoacoustic sheets and a frame over which the thermoacoustic sheets are disposed.

3. The transducer according to claim 2, wherein the thermoacoustic sheets comprise single or multi-walled carbon nanotube sheets.

4. The transducer according to claim 2, wherein the thermoacoustic sheets comprise wire mesh, carbon fiber, carbon fabric, metalized polymer fiber or graphene.

5. The transducer according to claim 2, wherein the frame over which the thermoacoustic sheets are disposed comprises at least one electrically conductive material.

6. The transducer according to claim 1, wherein the one or more thermoacoustic frames comprise a plurality of thermoacoustic frames and the thermoacoustic frames are spaced apart from each other by a predetermined distance.

7. The transducer according to claim 6, wherein a frequency of the second acoustic energy corresponds to the predetermined distance.

8. The transducer according to claim 7, wherein the frequency and the predetermined distance are adjustable.

9. The transducer according to claim 7, wherein the frequency is further based upon at least one of a current and/or a voltage level of the received electrical energy and dimensions of the acoustic reflector, the acoustic coupler and/or the thermoacoustic frames.

10. The transducer according to claim 6, wherein the predetermined distance is substantially equal to $n\lambda$, where $\lambda$ is a wavelength of the second acoustic energy and n is an integer number.

11. The transducer according to claim 6, wherein each of the thermoacoustic frames has at least one side and opposing first and second surfaces, and the first and second surfaces of a first selected one of the thermoacoustic frames are substantially parallel with respect to the first and second surfaces of each of the other thermoacoustic frames.

12. The transducer according to claim 1, wherein a distance between the acoustic reflector and the acoustic coupler is adjustable.

13. The transducer according to claim 1, wherein a frequency of the second acoustic energy is greater than about 100 kilohertz (kHz).

14. The transducer according to claim 13, wherein the frequency of the second acoustic energy is between about 110 kHz and about 113.5 kHz, and a bandwidth of the second acoustic energy is between about 4.4 kHz and about 6.4 kHz.

15. The transducer according to claim 1, wherein the acoustic reflector comprises one or more acoustically reflective materials having an acoustic reflectance substantially equal to about one hundred percent.

16. The transducer according to claim 1, wherein each of the thermoacoustic frames corresponds to a stage of the transducer and a beam profile of the second acoustic energy is based upon a number of stages in the transducer.

17. A transducer, comprising:
    an acoustic reflector;
    a plurality of acoustic couplers; and
    one or more thermoacoustic frames, wherein a first selected one of the thermoacoustic frames is disposed between the acoustic reflector and a first selected one of the acoustic couplers that is proximate to the acoustic reflector and distal from an output of the transducer, and remaining ones of the thermoacoustic frames are disposed between at least two of the acoustic couplers, and wherein the thermoacoustic frames, the acoustic reflector and the acoustic couplers form a resonator with each of the thermoacoustic frames configured to emit a broadband acoustic signal in response to receiving electrical energy, and the resonator configured to emit a narrowband acoustic signal at the transducer output in response to receiving the broadband acoustic signal.

18. The transducer according to claim 17, wherein the thermoacoustic frames each comprise one or more thermoacoustic sheets and a frame over which the thermoacoustic sheets are disposed, and the thermoacoustic sheets comprise single or multi-walled carbon nanotube sheets.

19. The transducer according to claim 17, wherein the thermoacoustic frames and the acoustic couplers are spaced apart from each other by a predetermined distance.

20. A method, comprising:
    receiving electrical energy at an input of one or more thermoacoustic frames;
    emitting, by each of the thermoacoustic frames, a broadband acoustic signal in response to the received electrical energy;
    receiving, by an acoustic reflector and an acoustic coupler, the broadband acoustic signal;
    emitting, by a resonator formed by the thermoacoustic frames, the acoustic reflector and the acoustic coupler, a narrowband acoustic signal in response to the acoustic reflector and the acoustic coupler receiving the broadband acoustic signal; and
    adjusting a frequency of the narrowband acoustic signal by controlling a spacing between the thermoacoustic frames and one or more components of the resonator.

\* \* \* \* \*